(12) United States Patent
Kim et al.

(10) Patent No.: US 10,545,633 B2
(45) Date of Patent: Jan. 28, 2020

(54) IMAGE OUTPUT METHOD AND APPARATUS FOR PROVIDING GRAPHICAL USER INTERFACE FOR PROVIDING SERVICE

(71) Applicant: SAMSUNG ELECTRONICS CO., LTD., Suwon-si, Gyeonggi-do (KR)

(72) Inventors: Ki-tae Kim, Seoul (KR); Jang-won Seo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 278 days.

(21) Appl. No.: 15/390,971

(22) Filed: Dec. 27, 2016

(65) Prior Publication Data
US 2017/0262143 A1    Sep. 14, 2017

(30) Foreign Application Priority Data

Mar. 11, 2016   (KR) .................. 10-2016-0029682

(51) Int. Cl.
*G06F 3/0482* (2013.01)
*G06F 3/0481* (2013.01)
*G06F 3/0484* (2013.01)
*H04N 21/431* (2011.01)

(52) U.S. Cl.
CPC ........ *G06F 3/0482* (2013.01); *G06F 3/04812* (2013.01); *G06F 3/04817* (2013.01); *G06F 3/04845* (2013.01); *H04N 21/4312* (2013.01)

(58) Field of Classification Search
CPC .......... H04N 21/4122; H04N 21/4126; H04N 21/4312; H04N 21/4316; H04N 21/8176; H04N 5/4403; G06F 3/0482
See application file for complete search history.

(56) References Cited

U.S. PATENT DOCUMENTS

| | | | | |
|---|---|---|---|---|
| 2005/0132361 A1* | 6/2005 | Uchida | .................. | G06F 3/0482 717/178 |
| 2008/0141172 A1* | 6/2008 | Yamamoto | ............ | G06F 3/0482 715/835 |
| 2011/0134024 A1* | 6/2011 | Park | ..................... | H04N 5/4403 345/156 |
| 2011/0242415 A1* | 10/2011 | Wakabayashi | ............ | G06F 3/14 348/554 |
| 2012/0079416 A1* | 3/2012 | Fagans | ................ | G06F 3/04845 715/781 |
| 2012/0274863 A1* | 11/2012 | Chardon | ............. | G06F 3/04886 348/734 |
| 2013/0088332 A1* | 4/2013 | Park | ................... | H04N 21/4126 340/10.1 |

(Continued)

*Primary Examiner* — Dino Kujundzic
(74) *Attorney, Agent, or Firm* — Nixon & Vanderhye P.C.

(57) ABSTRACT

A method of providing, by an image output apparatus, a graphical user interface (GUI) for providing a service to a user is provided, the method including: displaying a selection menu for determining whether to execute a pre-set function related to a service corresponding to an external apparatus when the external apparatus is connected to the image output apparatus; determining whether to display a function list indicating at least one detail function of the service corresponding to the external apparatus, based on a selection input with respect to the selection menu; and displaying the function list based on a result of the determining.

18 Claims, 19 Drawing Sheets

(56) References Cited

U.S. PATENT DOCUMENTS

| | | | |
|---|---|---|---|
| 2015/0067729 A1* | 3/2015 | Yoon | G06F 3/0482 |
| | | | 725/37 |
| 2015/0195789 A1* | 7/2015 | Yoon | G06F 3/0488 |
| | | | 345/173 |
| 2015/0288912 A1* | 10/2015 | Chun | H04N 21/4126 |
| | | | 348/552 |
| 2015/0289422 A1 | 10/2015 | Taschner et al. | |
| 2015/0341571 A1* | 11/2015 | Majid | H04N 5/445 |
| | | | 348/564 |
| 2016/0066011 A1* | 3/2016 | Ro | H04N 21/42222 |
| | | | 725/38 |
| 2016/0349948 A1* | 12/2016 | Shigemitsu | G06F 3/0482 |
| 2017/0237931 A1* | 8/2017 | Lee | G06F 3/0346 |
| | | | 348/565 |

\* cited by examiner

IMAGE OUTPUT METHOD AND APPARATUS FOR PROVIDING GRAPHICAL USER INTERFACE FOR PROVIDING SERVICE

CROSS-REFERENCE TO RELATED APPLICATION

This application is based on and claims priority under 35 U.S.C. § 119 to Korean Patent Application No. 10-2016-0029682, filed on Mar. 11, 2016, in the Korean Intellectual Property Office, the disclosure of which is incorporated by reference herein in its entirety.

BACKGROUND

1. Field

The present disclosure relates generally to image output methods and image output apparatuses, and for example, to an image output method and an image output apparatus which displays a function of an external apparatus connected to the image output apparatus.

2. Description of Related Art

An image output apparatus is an apparatus having a function of displaying an image viewable by a user. The user may view various types of content through the image output apparatus. Recently, a smart television (TV) providing various types of content in addition to a digital broadcasting function has been provided. The smart TV aims to analyze and provide content desired by the user without manipulation by the user, instead of being manually operated according to selection by the user.

Also, a function of outputting functions of an external apparatus through the image output apparatus by connecting the external apparatus to the image output apparatus is being developed. Accordingly, user demand for the ability to variously use the image output apparatus is increasing.

SUMMARY

An image output apparatus for providing a function list for executing detail function of an external apparatus connected to the image output apparatus is provided.

Additional aspects will be set forth in part in the description which follows and, in part, will be apparent from the description.

According to an aspect of an example embodiment, a method of providing, by an image output apparatus, a graphical user interface (GUI) for providing a service to a user, the method includes: displaying a selection menu for determining whether to execute a pre-set function related to a service corresponding to an external apparatus when the external apparatus is connected to the image output apparatus; determining whether to display a function list indicating at least one detail function of the service corresponding to the external apparatus, based on a selection input with respect to the selection menu; and displaying the function list based on a result of the determining.

The displaying of the selection menu may include displaying the selection menu in a notification window for notifying that the external apparatus is connected to the image output apparatus.

The displaying of the selection menu may include: displaying a notification window for notifying that the external apparatus is connected to the image output apparatus; and displaying the selection menu after the notification window is displayed.

The at least one detail function may include the pre-set function related to the service while controlling the service corresponding to the external apparatus.

The function list indicating the at least one detail function may include items for executing the at least one detail function.

The method may further include: receiving an input for selecting the function list; and executing a detail function of the external apparatus, which corresponds to the selected function list.

The method may further include: ending the execution of the detail function; and displaying a shortcut icon for re-executing the detail function.

The method may further include re-executing the detail function that was being executed before the ending of the executed detail function, when the shortcut icon is selected.

The displaying of the function list may include displaying the function list together with information indicating a type of a communication interface for connecting the external apparatus to the image output apparatus.

The displaying of the function list may include displaying the function list when an edge portion of a screen of the image output apparatus is selected.

The displaying of the function list may include displaying the function list at a pre-set portion of the edge portion of the screen.

The method may further include displaying a list of the external apparatus and other external apparatuses connected to the image output apparatus.

The method may further include: displaying a cursor on a display of the image output apparatus; detecting an input for moving the cursor; and moving the cursor based on the input and changing an attribute of the function list based on a location relationship between the function list and the cursor.

The changing of the attribute may include: changing a size of the function list; enlarging an item displayed in the function list; reducing the item displayed in the function list; and changing opacity of the item displayed in the function list.

The function list may be displayed when a location of the cursor is at a pre-set portion on the display.

According to an aspect of another example embodiment, an image output apparatus for providing a GUI for providing a service to a user, the image output apparatus includes: a display configured to display a selection menu for determining whether to execute a pre-set function related to a service corresponding to an external apparatus when the external apparatus is connected to the image output apparatus; and a controller configured to determine whether to display a function list indicating at least one detail function of the service corresponding to the external apparatus, based on a selection input with respect to the selection menu, wherein the display is further configured to display the function list based on determination of the controller.

The display may be further configured to display the selection menu in a notification window for notifying that the external apparatus is connected to the image output apparatus.

The display may be further configured to display a notification window for notifying that the external apparatus is connected to the image output apparatus, and the controller may be further configured to control the selection menu to be displayed after the notification window is displayed.

The at least one detail function may include the pre-set function related to the service while controlling the service corresponding to the external apparatus.

The function list indicating the at least one detail function may include items for executing the at least one detail function.

The image output apparatus may further include input circuitry configured to receive an input for selecting the function list, wherein the controller may be further configured to control executing of a detail function of the external apparatus, which corresponds to the selected function list.

The controller may be further configured to control ending of the execution of the detail function and to provide a shortcut icon for re-executing the detail function to be displayed.

The controller may be further configured to control the detail function that was being executed before the ending of the executed detail function, to be re-executed when the shortcut icon is selected.

The display may be further configured to display the function list together with information indicating a type of a communication interface for connecting the external apparatus to the image output apparatus.

The controller may be further configured to control displaying of the function list when an edge portion of a screen of the image output apparatus is selected.

The controller may be further configured to control displaying of the function list at a pre-set portion of the edge portion of the screen.

The controller may be further configured to control displaying of a list of the external apparatus and other external apparatuses connected to the image output apparatus.

The display may be further configured to display a cursor on a display of the image output apparatus.

The controller may be further configured to control moving of the cursor based on an input for moving the cursor and to change of an attribute of the function list based on a location relationship between the function list and the cursor.

The controller may be configured to control at least one of changing of a size of the function list, enlarging of an item displayed in the function list, reducing of the item displayed in the function list, and changing of opacity of the item displayed in the function list.

The controller may be further configured to control displaying of the function list when a location of the cursor is at a pre-set portion on the display.

According to an aspect of another example embodiment, a non-transitory computer-readable recording medium has recorded thereon a program, which when executed by a computer, performs the method.

BRIEF DESCRIPTION OF THE DRAWINGS

These and/or other aspects and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
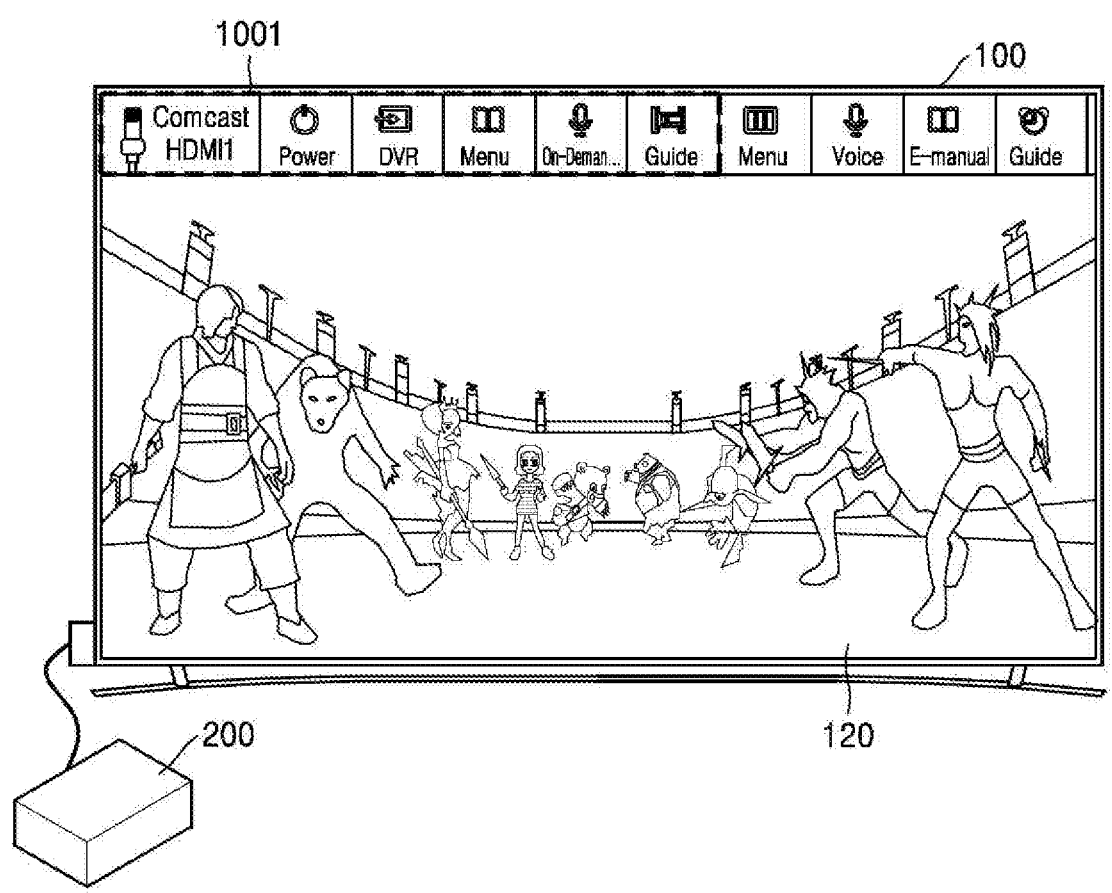
FIG. 1 is a diagram illustrating an example image output apparatus displaying a function list of an external apparatus, according to an example embodiment.

One or more example embodiments of the present disclosure will now be described more fully with reference to the accompanying drawings. However, the one or more embodiments may be embodied in many different forms, and should not be construed as being limited to the embodiments set forth herein; rather, these embodiments are provided so that this disclosure will be thorough and complete, and will fully convey the concept of the one or more embodiments of the present disclosure to those of ordinary skill in the art. In the following description, well-known functions or constructions may not be described in detail if they obscure the one or more embodiments of the present disclosure with unnecessary detail, and like reference numerals in the drawings denote like or similar elements throughout the specification.

All terms including descriptive or technical terms which are used herein should be construed as having meanings that are apparent to one of ordinary skill in the art. However, the terms may have different meanings according to an intention of one of ordinary skill in the art, precedent cases, or the appearance of new technologies. Also, some terms may be arbitrarily selected, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

The use of the terms "a" and "an" and "the" and similar referents in the context of describing the disclosure (especially in the context of the following claims) are to be construed to cover both the singular and the plural. Also, the steps of all methods described herein may be performed in any suitable order unless otherwise indicated herein or otherwise clearly contradicted by context.

The phase "some embodiments" or "an embodiment" used herein does not necessarily denote the same embodiment.

Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more example embodiments of the present disclosure will be described in greater detail with reference to accompanying drawings.

FIG. 1 is a diagram illustrating an example image output apparatus 100 displaying a function list 1001 of an external apparatus, according to an example embodiment.

As illustrated in FIG. 1, the image output apparatus 100 may be a television (TV), but this is only an example, and may be any electronic apparatus including a display 120. For example, the image output apparatus 100 may be realized as any one of various electronic apparatuses, such as a mobile phone, a tablet personal computer (PC), a digital camera, a camcorder, a laptop computer, a desktop computer, an electronic book terminal, a digital broadcasting terminal a personal digital assistant (PDA), a portable multimedia player (PMP), a navigation, an MP3 player, and a wearable device, or the like, but is not limited thereto. For example, one or more embodiments may be easily embodied in a display apparatus having the large display 120, but are not limited thereto. Also, the image output apparatus 100 may be a fixed type or a moving type, and may be a digital broadcasting receiver capable of receiving a digital broadcast.

The image output apparatus 100 may be realized as not only a flat display apparatus, but also a curved display apparatus having a curved screen or a flexible display apparatus having adjustable curvature. Output resolution of the image output apparatus 100 may include, for example, high definition (HD), full HD, ultra HD, or shaper definition than ultra HD.

An external apparatus 200 may be connected to the image output apparatus 100. The external apparatus 200 may execute a function of the external apparatus 200 through the display 120 of the image output apparatus 100.

For example, the external apparatus 200 may be a digital video disc (DVD) player capable of outputting an image through the image output apparatus 100. The external apparatus 200 may be realized as any one of various electronic apparatuses, such as a mobile phone, a tablet PC, a digital camera, a camcorder, a laptop computer, a desktop computer, an electronic book terminal, a digital broadcasting terminal, a PDA, a PMP, a navigation, an MP3 player, and a wearable device, or the like, but is not limited thereto. Alternatively, the external apparatus 200 may be a storage medium. For example, the external apparatus 200 may be one of a micro secure digital (SD) card, a universal serial bus (USB) memory, a non-volatile memory, a volatile memory, a hard disk drive (HDD), and a solid state drive (SSD), or the like. However, the external apparatus 200 is not limited thereto.

When the external apparatus 200 is connected to the image output apparatus 100, the image output apparatus 100 may determine whether to execute a service corresponding to the external apparatus 200. Whether to execute a function of the external apparatus 200 may be determined according to an input of a user or control of the image output apparatus 100.

When the image output apparatus 100 does not immediately execute the service corresponding to the external apparatus 200, the image output apparatus 100 may display the function list 1001 indicating a connection state of the external apparatus 200 and for executing the function corresponding to the external apparatus 200.

The function list 1001 may be a graphical user interface (GUI) or a user interface (UI) provided to indicate the connection state of the external apparatus 200 and execute the function corresponding to the external apparatus 200. The user may determine that the external apparatus 200 is connected to the image output apparatus 100 through the function list 1001 displayed on the image output apparatus 100.

The function list 1001 may include a detail function list as a pre-set function related to the service. A detail function may include a function for providing an environment provided by a service. For example, a detail function may be an image switching function provided by an image providing service. The function list 1001 may include items for executing detail functions. The items may respectively correspond to executing of the detail functions. The user may select the item from the function list 1001 to immediately execute the function of the external apparatus 200.

Figure 2:
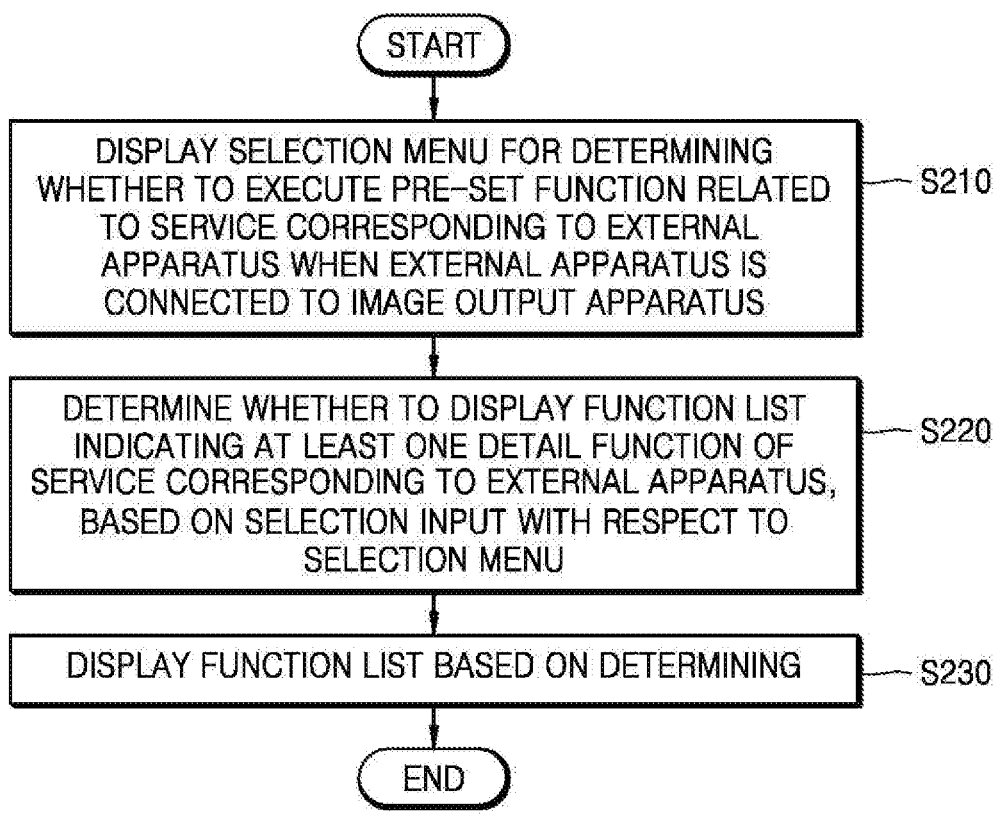
FIG. 2 is a flowchart illustrating an example method of providing, by an image output apparatus, a graphical user interface (GUI) for providing a service to a user, according to an example embodiment.

FIG. 2 is a flowchart illustrating an example method of providing, by the image output apparatus 100, a GUI for providing a service to a user, according to an example embodiment.

In operation S210, the image output apparatus 100 may display a selection menu for determining whether to execute a pre-set function related to a service corresponding to an external apparatus, when the external apparatus is connected to the image output apparatus 100.

The image output apparatus 100 may display the selection menu to determine whether to execute the pre-set function related to the service corresponding to the external apparatus.

Here, the service corresponding to the external apparatus may be a function provided by the external apparatus through the image output apparatus 100. The external apparatus may provide one or more functions. The service corresponding to the external apparatus may be a service set to be priorly executed from among at least one function provided by the external apparatus. For example, when the external apparatus is a game device, the services corresponding to the external apparatus may include game playing, power on/off, and configuration setting. Here, the game playing may be set as a pre-set function such that a game may start when the external apparatus is connected to the image output apparatus 100. The image output apparatus 100 may display the selection menu for determining whether to start the game provided by the game device.

The image output apparatus 100 may be connected to a plurality of external apparatuses. The image output apparatus 100 may set a priority of the plurality of external apparatuses, and determine a display order of function lists according to the set priority.

The image output apparatus 100 may display the selection menu by using a separate window. The image output apparatus 100 may display the selection menu by outputting a notification message, displaying a popup window, or displaying at an edge of an existing window.

Also, the image output apparatus 100 may display the selection menu within a notification window for notifying that the external apparatus is connected.

Accordingly, when the external apparatus is connected, a selection input may be received from the user instead of the function corresponding to the external apparatus being automatically executed. The image output apparatus 100 may display the selection menu without having to stop reproducing existing content being displayed on the image output apparatus 100.

In operation S220, the image output apparatus 100 may determine whether to display a function list indicating at least one detail function of the service corresponding to the external apparatus, based on a selection input (e.g., from the user) with respect to the selection menu.

The image output apparatus 100 may receive the selection input with respect to the selection menu. The selection input of the user may be an input about whether to immediately execute the pre-set function.

The at least one detail function of the service corresponding to the external apparatus may be a function executable through the external apparatus. The detail function may include power on/off of the external apparatus, a configuration, a content list included in the external apparatus, image reproduction, and folder view. The function list indicating the detail functions may include items for executing the detail functions, but is not limited thereto.

In operation S230, the image output apparatus 100 may display the function list based on a result of the determining in operation S220. The result of the determining may be determination not to execute the pre-set function related to the service corresponding to the external apparatus. The image output apparatus 100 may display the function list when it is determined not to execute the pre-set function.

The function list may include at least one function for controlling the external apparatus. The function list may provide the at least one function as a GUI in the image output apparatus 100. The function list may include icons. The function list may include at least one icon for executing at least one function.

Figure 3:
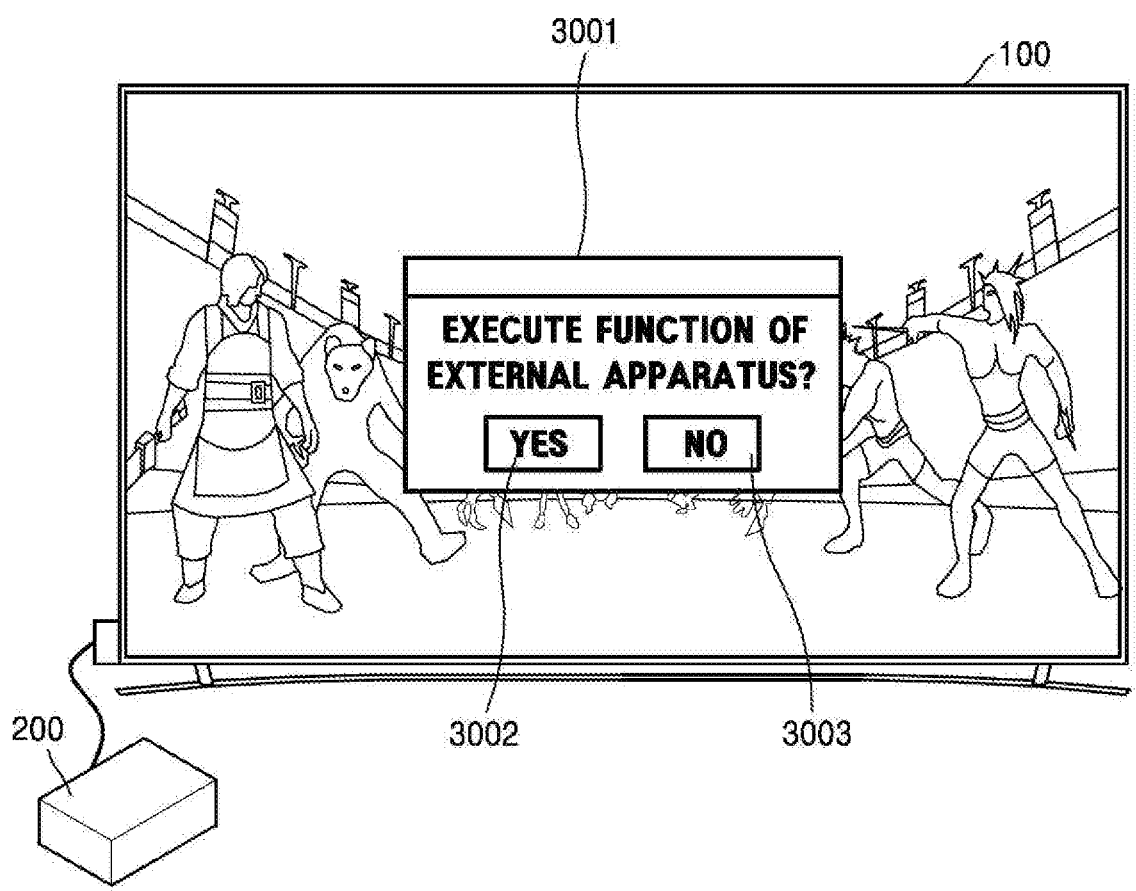
FIG. 3 is a diagram illustrating an example image output apparatus displaying a selection menu when an external apparatus is connected to the image output apparatus, according to an example embodiment.

FIG. 3 is a diagram illustrating an example image output apparatus 100 displaying a selection menu 3001 when the external apparatus 200 is connected to the image output apparatus 100, according to an example embodiment.

As illustrated in FIG. 3, when the external apparatus 200 is connected, the image output apparatus 100 may determine whether to execute a service corresponding to the external apparatus 200. The image output apparatus 100 may receive an input of a user about whether to execute the service corresponding to the external apparatus 200.

The image output apparatus 100 may display the selection menu 3001 for determining whether to execute a pre-set function related to the service corresponding to the external apparatus 200. The selection menu 3001 may include a guide about the service corresponding to the external apparatus 200 and details about whether to immediately execute the service.

The image output apparatus 100 may display the selection menu 3001 may using a separate window, a popup message, or the like. The image output apparatus 100 may display the selection menu 3001 at the top, bottom, middle, or edge of a display of the image output apparatus 100. The image output apparatus 100 may display the selection menu 3001 in a pre-set region of the display.

The user may determine whether to execute the function of the external apparatus 200 from the displayed selection menu 3001. For example, when the user determines to execute the function of the external apparatus 200 by selecting "Yes" 3002, the service corresponding to the external apparatus 200 may be immediately executed. When there is existing content being executed, the image output apparatus 100 may stop executing the existing content and execute the function of the external apparatus 200. Alternatively, the image output apparatus 100 may execute the function of the external apparatus 200 while executing the existing content. However, an embodiment is not limited thereto.

The image output apparatus 100 may receive an input of the user determining not to execute the function of the external apparatus 200 when the user selects "No" 3003. Based on the input determining not to execute the function of the external apparatus 200, the image output apparatus 100 may continuously execute the existing content. Also, based on the input determining not to execute the function of the external apparatus 200, the image output apparatus 100 may generate a function list. The image output apparatus 100 may generate and display the function list including a connection state of the external apparatus 200 and detail functions that are immediately executable.

Figure 4:
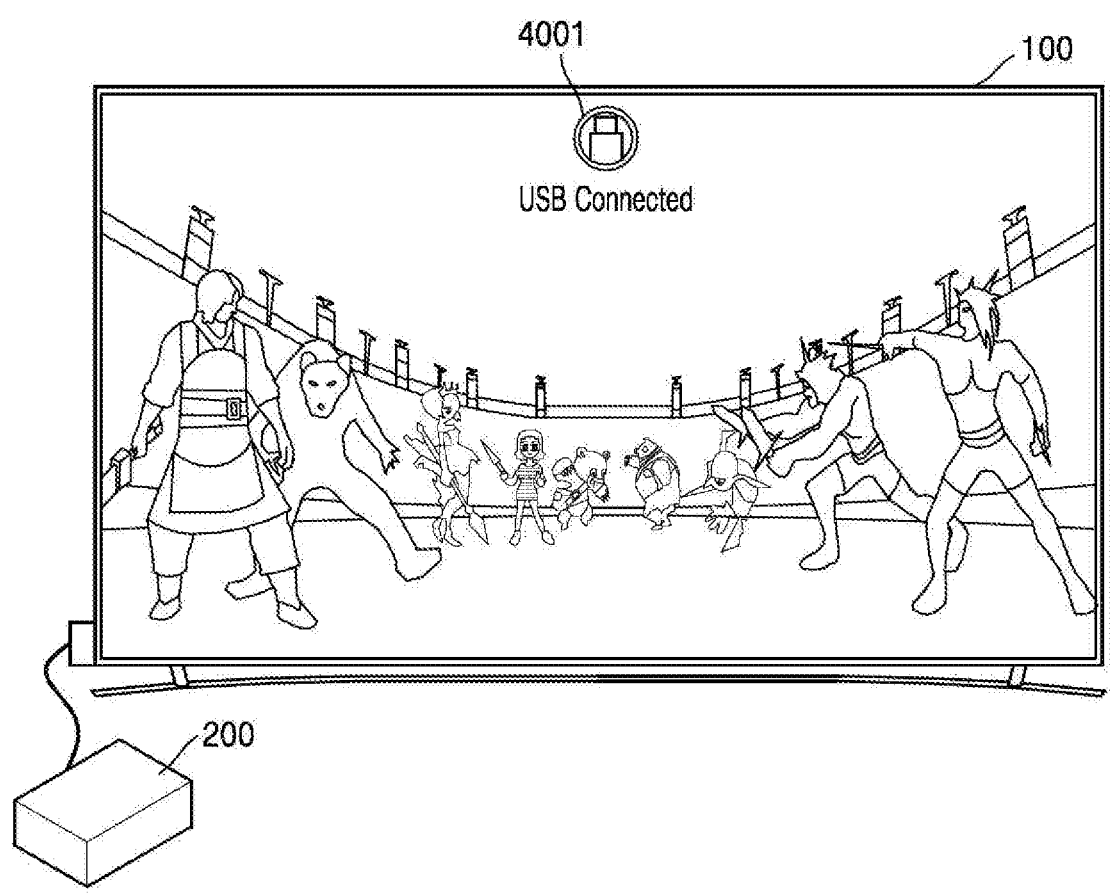
FIG. 4 is a diagram illustrating an example image output apparatus displaying that an external apparatus is connected, according to an example embodiment.

FIG. 4 is a diagram illustrating an example image output apparatus 100 displaying that the external apparatus 200 is connected, according to an example embodiment.

As illustrated in FIG. 4, the image output apparatus 100 may notify a user that the external apparatus 200 is connected to the image output apparatus 100. The image output apparatus 100 may display, on a display, information that the external apparatus 200 is connected.

According to an example embodiment, when the external apparatus 200 is a USB memory, the image output apparatus 100 may display an icon 4001 indicating that the USB memory is connected. The image output apparatus 100 may display the information that the external apparatus 200 is connected through a notification window. The notification window may be displayed as a popup message or a separate window. Content of the notification window may be displayed in text, an image, a video, or animation.

The image output apparatus 100 may display a selection menu after displaying the information that the external apparatus 200 is connected. After checking that the external apparatus 200 is connected, a user may determine whether to execute the external apparatus 200.

Alternatively, the image output apparatus 100 may display the selection menu in the notification window indicating that the external apparatus 200 is connected. The user may determine whether to execute the external apparatus 200 immediately after checking that the external apparatus 200 is connected.

Figure 5:
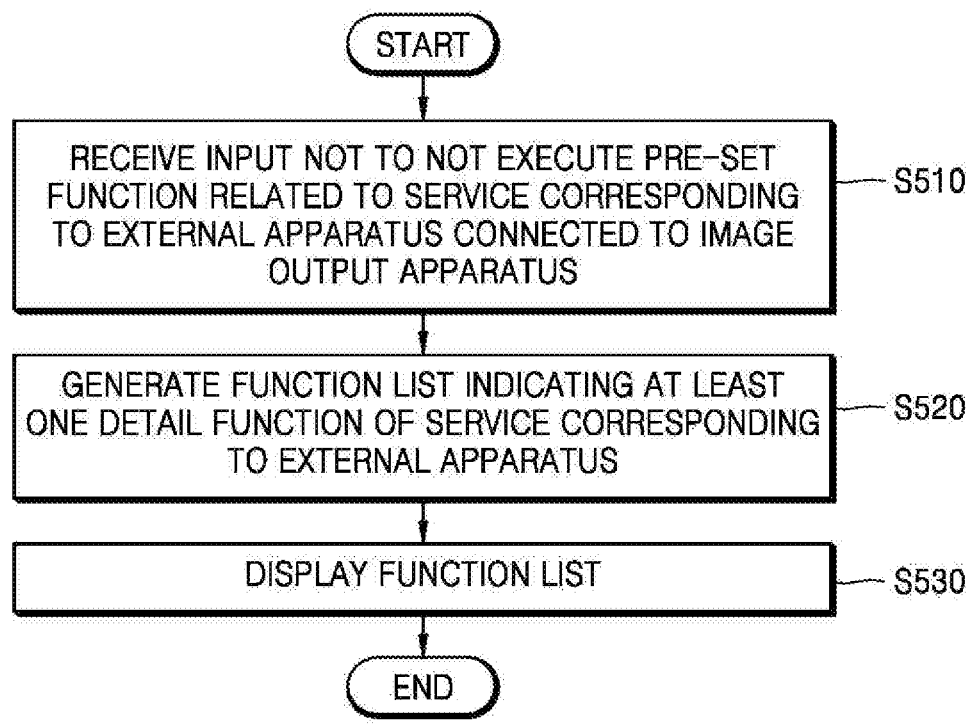
FIG. 5 is a flowchart illustrating an example method of displaying, by an image output apparatus, a function list of an external apparatus, according to an example embodiment.

FIG. 5 is a flowchart illustrating an example method of displaying, by the image output apparatus 100, a function list of an external apparatus, according to an example embodiment.

In operation S510, the image output apparatus 100 may receive a selection input selecting to not execute a pre-set function related to a service corresponding to the external apparatus connected to the image output apparatus 100.

When the external apparatus is connected, the image output apparatus 100 may receive, from the user, a selection about whether to execute the service corresponding to the external apparatus. The image output apparatus 100 may display a selection menu on a display of the image output apparatus 100.

The image output apparatus 100 may receive an input determining not to immediately execute the service corresponding to the external apparatus, from the user.

According to an example embodiment, the image output apparatus 100 may not receive any input with respect to the selection menu. When an input with respect to the selection menu is not received for a pre-set period of time, the image output apparatus 100 may determine not to execute the service corresponding to the external apparatus.

In operation S520, the image output apparatus 100 may generate a function list indicating at least one detail function of the service corresponding to the external apparatus.

Here, the detail function may include a pre-set function related to the service. The image output apparatus 100 may control the service corresponding to the external apparatus, through the detail function. The image output apparatus 100 may receive, from the external apparatus, information about the detail function for controlling the service corresponding to the external apparatus.

The detail function may include a control function of power on/off of the external apparatus, a configuration of the external apparatus, a file list included in the external apparatus, recording, and reproducing, but is not limited thereto.

In operation S530, the image output apparatus 100 may display the function list.

The image output apparatus 100 may display the function list when the external apparatus is not executed at the same time when the external apparatus is connected. The user may check that the external apparatus is connected when the function list is displayed on the image output apparatus 100. Also, the user may check functions of the external apparatus without having to enter an external input mode. The user may check a list of detail functions executable in the external apparatus from the function list.

Figure 6:
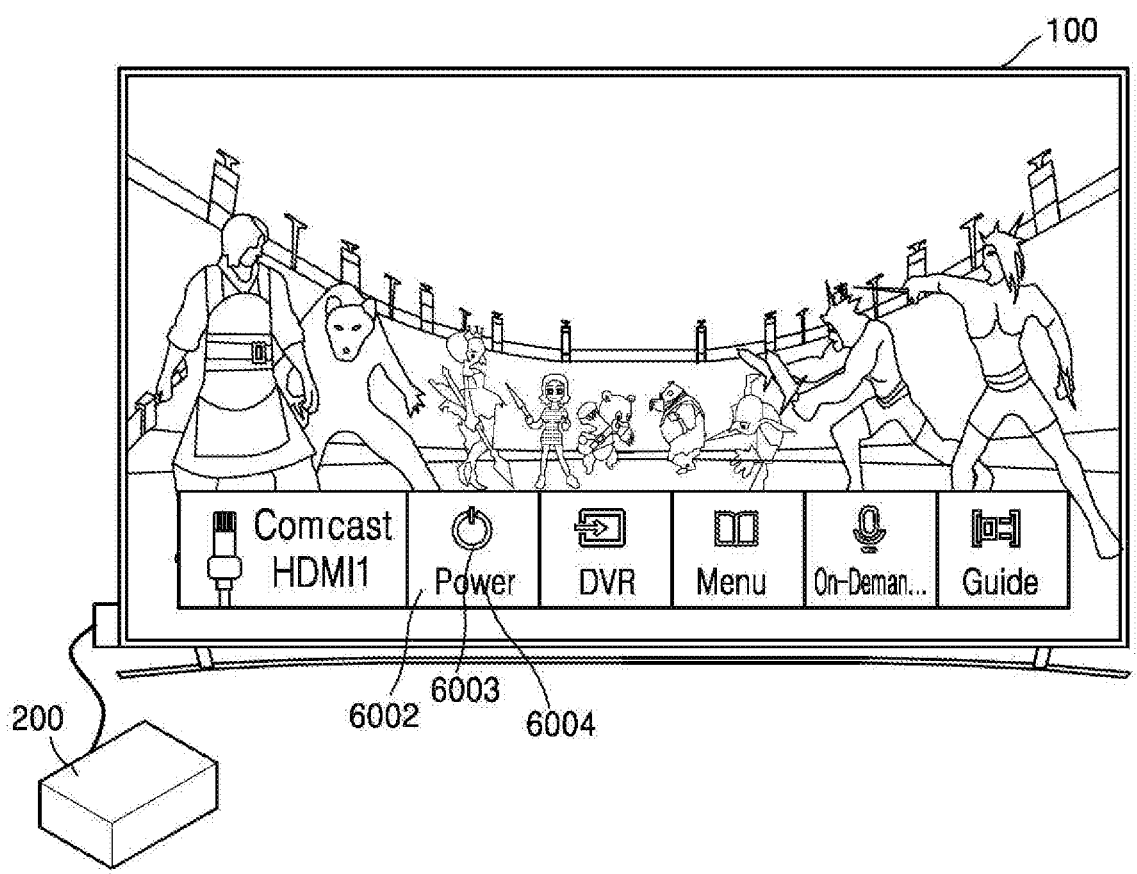
FIG. 6 is a diagram illustrating an example screen of an image output apparatus displaying a function list, according to an example embodiment.

FIG. 6 is a diagram illustrating an example screen of the image output apparatus 100 displaying a function list, according to an embodiment.

As illustrated in FIG. 6, when the external apparatus 200 connected to the image output apparatus 100 is not immediately executed, the image output apparatus 100 may display the function list.

The image output apparatus 100 may display information about a type of a communication interface through which the external apparatus 200 is connected, together with the function list. According to an embodiment, the communication interface may be a high definition multimedia interface (HDMI) port, but is not limited thereto.

The function list may include a detail function related to a service corresponding to the external apparatus 200. The detail function may be displayed in an icon 6002.

The icon 6002 displaying the detail function may be differently set according to functions. The icon 6002 may include at least one of an image and text. For example, as illustrated in FIG. 6, the icon 6002 of the detail function for controlling power of the external apparatus 200 may include an image 6003 denoting a power device and text 6004 of "POWER". The image and text of the icon 6002 may be determined based on information about the detail function. The image and text may be stored in a storage unit of the image output apparatus 100 or received from the external apparatus 200.

The icon 6002 of the detail function may be pre-set by the user or may be pre-determined by the image output apparatus 100 according to the detail function.

Figure 7:
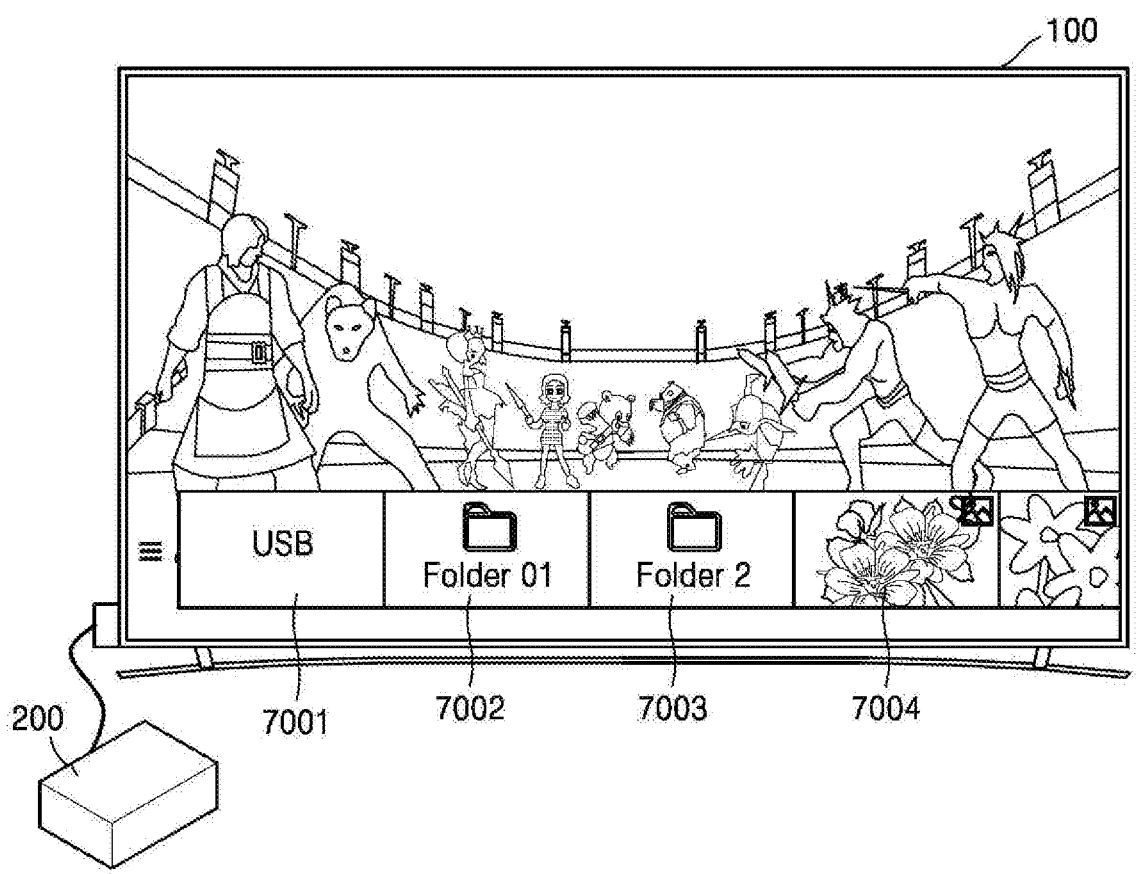
FIG. 7 is a diagram illustrating an example screen of an image output apparatus displaying a function list, according to another example embodiment.

FIG. 7 is a diagram illustrating an example screen of the image output apparatus 100 displaying a function list, according to another example embodiment.

According to an example embodiment, the external apparatus 200 in FIG. 7 may be a USB or another storage medium. However, the external apparatus 200 is not limited thereto.

When the external apparatus 200 is connected, the image output apparatus 100 may display a folder, content, and file included in the external apparatus 200. The image output apparatus 100 may display the folder, the content, and the file in thumbnails.

According to an example embodiment, the image output apparatus 100 may display a function list in a thumbnail. By checking the function list displayed on the image output apparatus 100, a user may easily check a type and content of the external apparatus 200. The function list may include a type 7001 of the external apparatus, e.g., a USB, and include two folders 7002 and 7003 and a picture 7004 included in the USB.

When the user selects a detail function from the function list, the image output apparatus 100 may immediately execute the selected detail function. The image output apparatus 100 may close an existing program being executed and execute the selected detail function.

For example, when the picture 7004 is elected by the user, the image output apparatus 100 may display the picture 7004 on a display of the image output apparatus 100. In order to display the picture 7004, the image output apparatus may execute a program in the image output apparatus 100, but an embodiment is not limited thereto.

Figure 8:
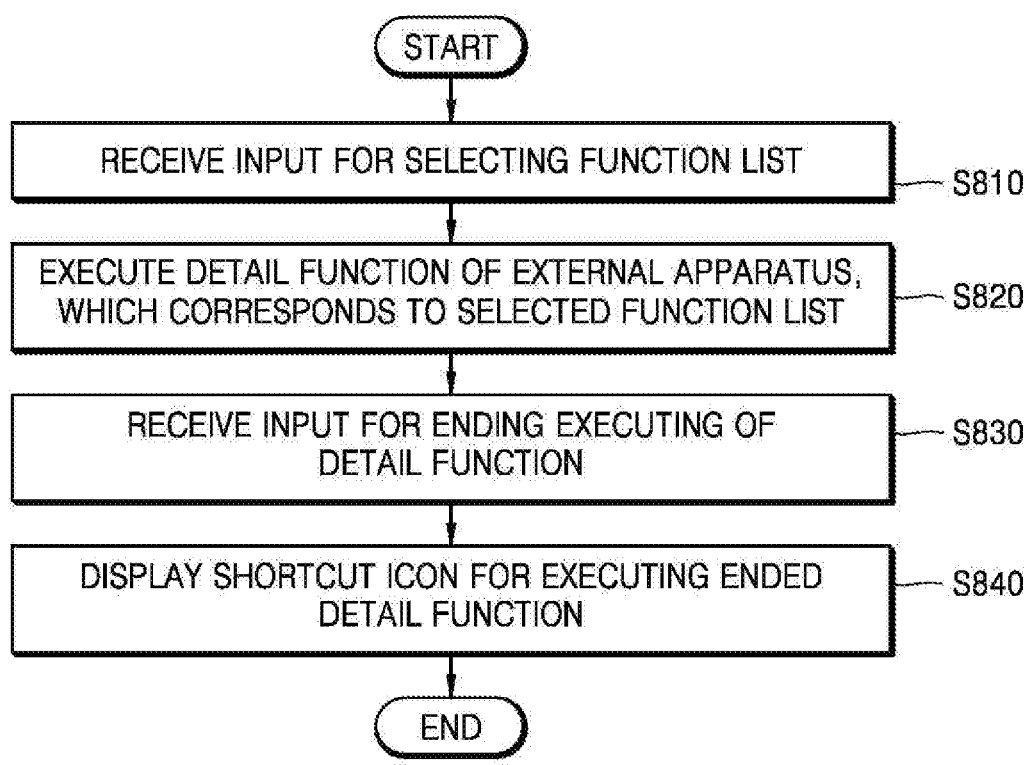
FIG. 8 is a flowchart illustrating an example method of generating, by an image output apparatus, a shortcut icon of an ended detail function, according to an example embodiment.

FIG. 8 is a flowchart illustrating an example method of generating, by the image output apparatus 100, a shortcut icon of an ended detail function, according to an example embodiment.

In operation S810, the image output apparatus 100 may receive an input for selecting a function list. The image output apparatus 100 may receive an input for selecting one of at least one detail function included in the function list. The input may be one of a touch input, an input using a control device, a voice input, and a motion input, but an input method is not limited thereto.

In operation S820, the image output apparatus 100 may execute a detail function of the external apparatus, which corresponds to the selected function list.

The image output apparatus 100 may immediately execute the detail function. The image output apparatus 100 may easily execute a function of the external apparatus only via an input of the user selecting the detail function included in the function list. In this case, the image output apparatus 100 may execute the detail function of the external apparatus without having to enter an external input mode.

In operation S830, the image output apparatus 100 may receive an input for ending the executing of the detail function. The image output apparatus 100 may end a service provided by the external apparatus at the same time the input for ending the executing of the detail function is received. The image output apparatus 100 may execute a function provided by the image output apparatus at the same time the service provided by the external apparatus is ended.

In operation S840, the image output apparatus 100 may display a shortcut icon for executing the ended detail function.

The shortcut icon may be a UI for re-executing the ended detail function. When the user selects the shortcut icon, the image output apparatus 100 may re-execute the detail function. The image output apparatus 100 may re-execute the detail function that was being executed in operation S820.

Figure 9:
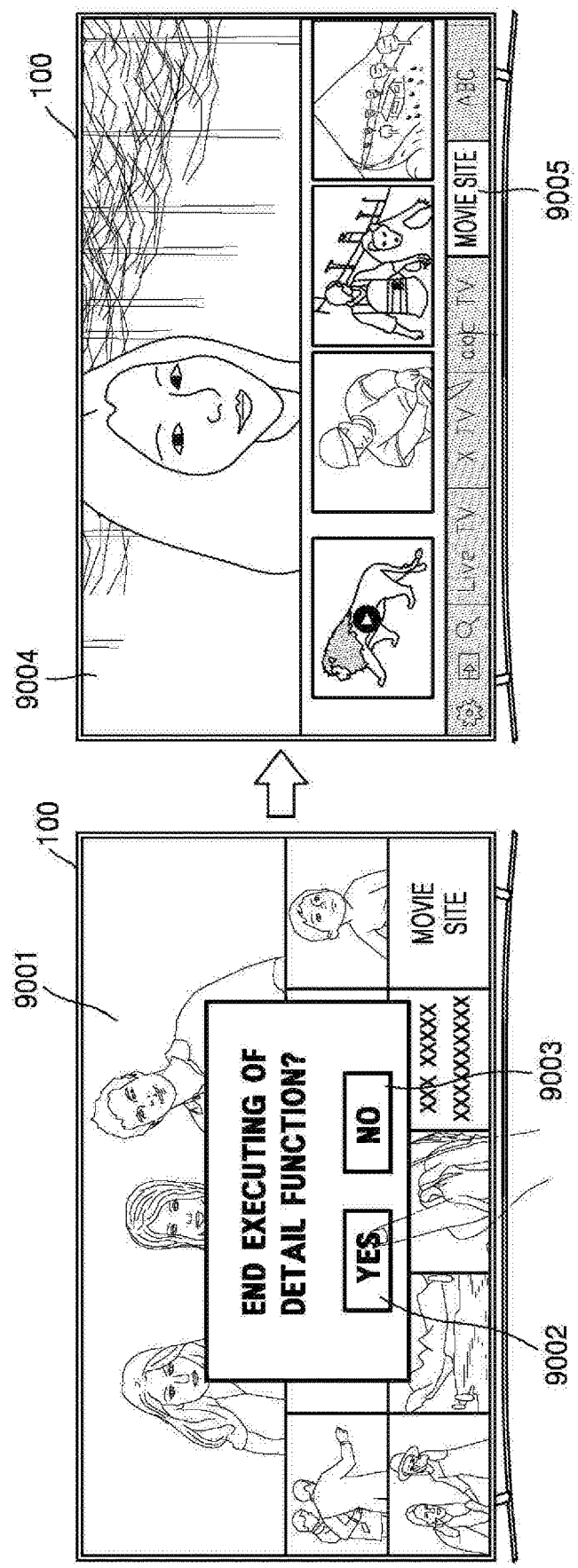
FIG. 9 is a diagram illustrating an example image output apparatus displaying a shortcut icon when a detail function is ended, according to an example embodiment.

FIG. 9 is a diagram illustrating an example image output apparatus 100 displaying a shortcut icon 9005 when a detail function is ended, according to an example embodiment.

As illustrated in FIG. 9, the image output apparatus 100 may execute a detail function corresponding to an external apparatus. According to an example embodiment, when a detail function of "MOVIE SITE" is being executed, the image output apparatus 100 may output an image 9001 corresponding to the detail function.

The image output apparatus 100 may receive an input for ending the detail function being executed. The image output apparatus 100 may output a message asking a user whether to end the detail function. The message include "YES" 9002 for ending the detail function and "NO" 9003 for not ending the detail function.

When the user selects "YES" 9002, the image output apparatus 100 may end the detail function. The image output apparatus 100 may generate the shortcut icon 9005 for immediately executing the ended detail function. The image output apparatus 100 may display the shortcut icon 9005 on a display of the image output apparatus 100. The shortcut icon 9005 may be displayed together with an application provided by the image output apparatus 100 or a UI for controlling the image output apparatus 100.

When the user selects the shortcut icon 9005, the image output apparatus 100 may re-execute the ended detail function. For example, when the user selects the shortcut icon 9005, the image output apparatus 100 may output an image 9004 provided by "MOVIE SITE".

Figure 10:
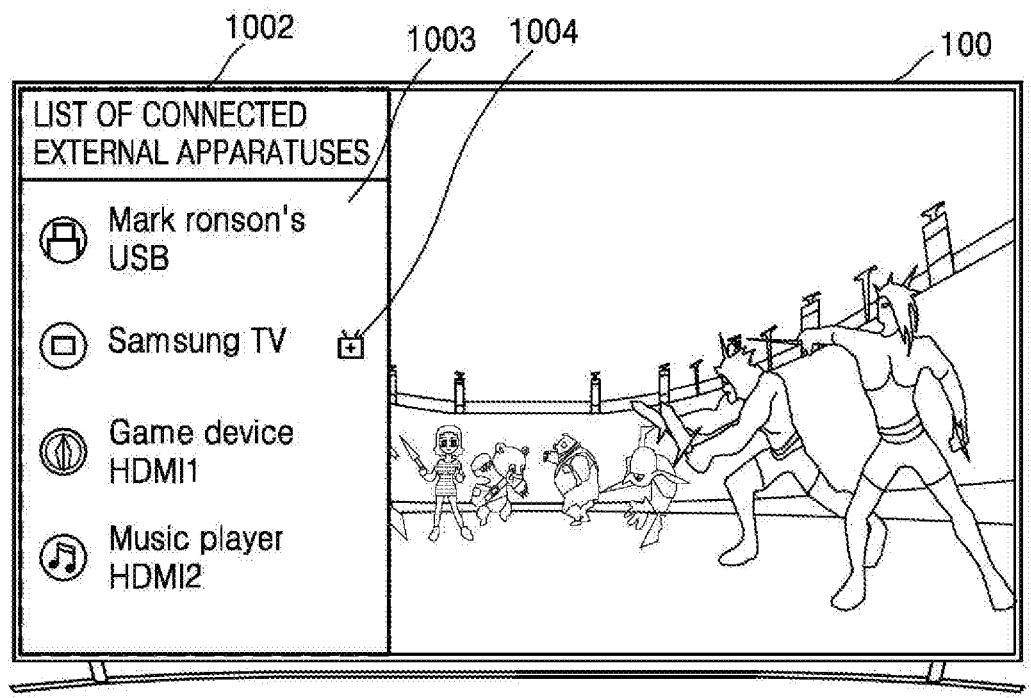
FIG. 10 is a diagram illustrating an example image output apparatus displaying a list of a plurality of external apparatuses connected to the image output apparatus, according to an example embodiment.

FIG. 10 is a diagram illustrating an example image output apparatus 100 displaying a list 1002 of a plurality of external apparatuses connected to the image output apparatus 100, according to an example embodiment.

The image output apparatus 100 may be connected to the plurality of external apparatuses. In this case, the image output apparatus 100 may generate the list 1002 of the plurality of external apparatuses. The image output apparatus 100 may display the list 1002 of the plurality of external apparatuses.

The image output apparatus 100 may display the list 1002 on a part of a display. The image output apparatus 100 may display the list 1002 on a pre-set region of the display for a pre-set period of time. The image output apparatus 100 may remove the list 1002 from the display after the pre-set period of time. When the image output apparatus 100 detects a user input of selecting the pre-set region, the image output apparatus 100 may display the removed list 1002 again.

Accordingly, the user may determine connection of the external apparatuses without having to enter an external input mode.

According to an embodiment, the image output apparatus 100 may display the connected external apparatuses using a notification window 1003. The image output apparatus 100 may display an indication 1004 for identifying an external apparatus corresponding to a service being currently executed through the display.

Figure 11:
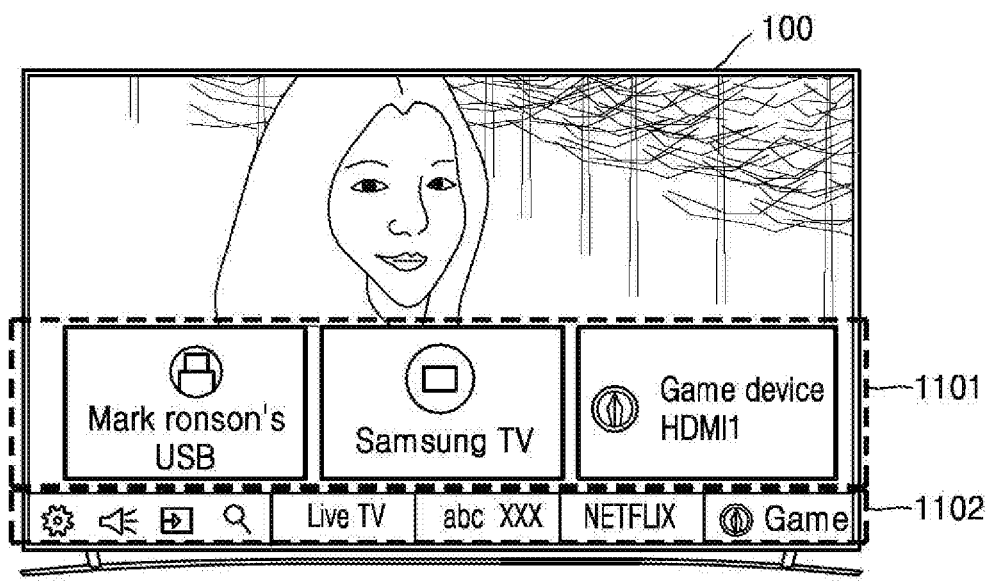
FIG. 11 is a diagram illustrating an example image output apparatus displaying a list of a plurality of external apparatuses connected to the image output apparatus, and a function list, according to an example embodiment.

FIG. 11 is a diagram illustrating an example image output apparatus 100 displaying a list 1101 of a plurality of external apparatuses connected to the image output apparatus, and a function list 1102, according to an example embodiment.

As illustrated in FIG. 11, the image output apparatus 100 may simultaneously display the list 1101 of the plurality of external apparatuses, and the function list 1102.

Locations of the list 1101 and the function list 1102 displayed on a display of the image output apparatus 100 may be different.

The function list 1102 may include at least one detail function of an external apparatus that is most recently connected to the image output apparatus 100.

When one external apparatus is selected from the list 1101, the image output apparatus 100 may display a function list for controlling a service corresponding to the selected external apparatus.

For example, when a game device is selected by a user, the image output apparatus 100 may display a function list for controlling a service corresponding to the game device.

Figure 12:
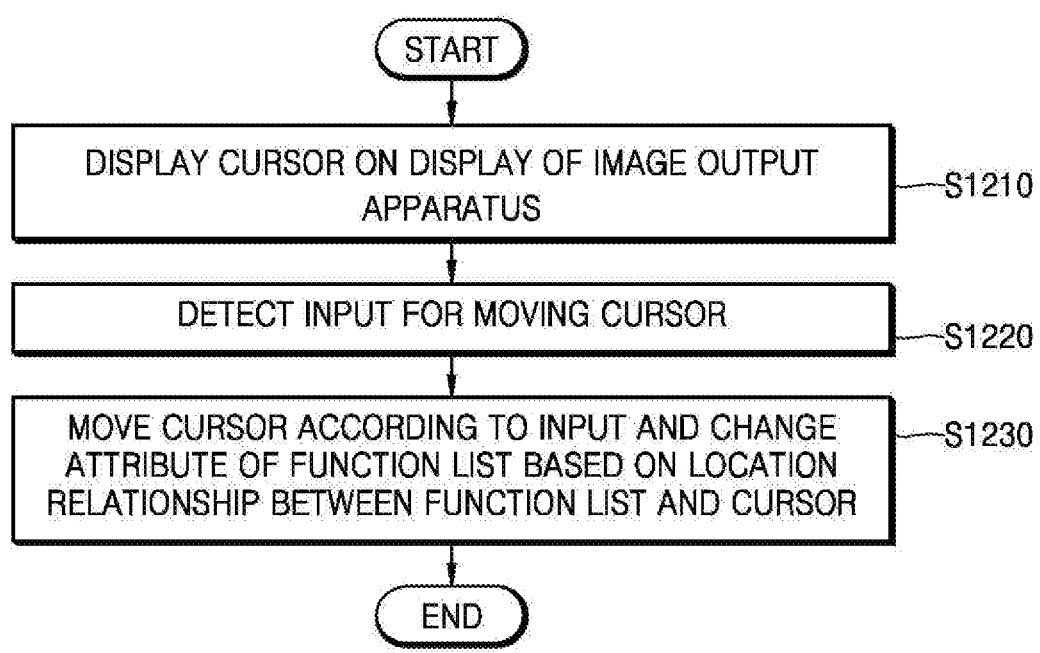
FIG. 12 is a flowchart illustrating an example method of changing, by an image output apparatus, an attribute of a function list according to a location relationship between the function list and a cursor, according to an example embodiment.

FIG. 12 is a flowchart illustrating an example method of changing, by the image output apparatus 100, an attribute of a function list according to a location relationship between the function list and a cursor, according to an example embodiment.

In operation S1210, the image output apparatus 100 may display the cursor on a display of the image output apparatus 100. The cursor may be an identification indicator enabling a user to check an input of the user through the display of the image output apparatus 100.

In operation S1220, the image output apparatus 100 may detect an input for moving the cursor. According to an example embodiment, the image output apparatus 100 may display the cursor on the display of the image output apparatus 100 when a certain key input is received through a control device or the like. However, an embodiment is not limited thereto.

For example, the image output apparatus 100 may detect an input of moving the control device to up, down, left, and right, or tiling the control device. Alternatively, the image output apparatus 100 may receive motion or voice of the user as the user input. However, the user input is not limited thereto.

The image output apparatus 100 may move the cursor on the display according to the input.

In operation S1230, the image output apparatus 100 may move the cursor according to the input, and change the attribute of the function list based on the location relationship between the function list and the cursor.

For example, the image output apparatus 100 may detect a moving direction and a moving degree of the user input, and move the cursor on the display according to the detected moving direction and moving degree. Also, the image output apparatus 100 may move the cursor on the display according to a direction of a touch input detected on a touch panel of the control device.

The image output apparatus 100 may change the attribute of the function list where the cursor is located based on the user input to enable the user to easily distinguish the function list.

Also, the image output apparatus 100 may change a size of the function list. Also, the image output apparatus 100 may control at least one of enlarging of an item displayed in the function list, reducing of the item displayed in the function list, and changing of opacity of the item displayed in the function list.

Figure 13B:
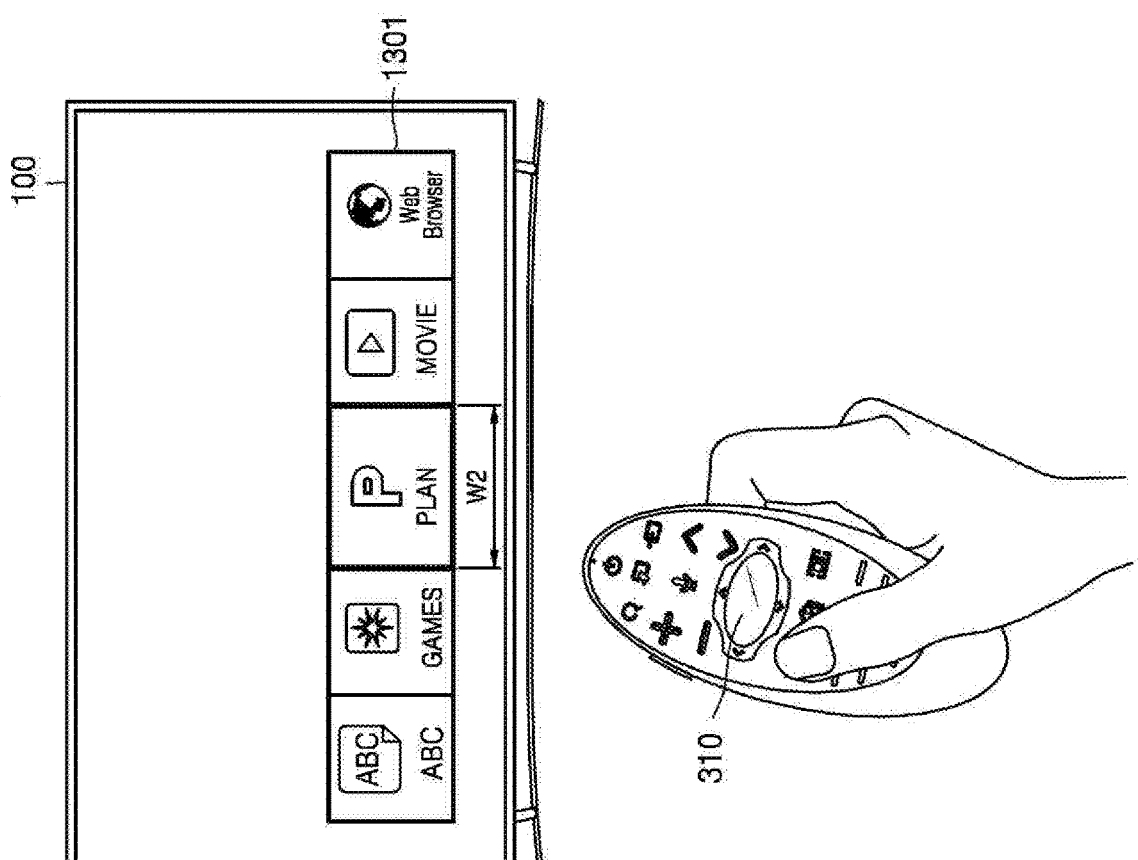
FIGS. 13A and 13B are diagrams illustrating an example image output apparatus changing an attribute of a function list, according to an example embodiment.
Figure 13A:
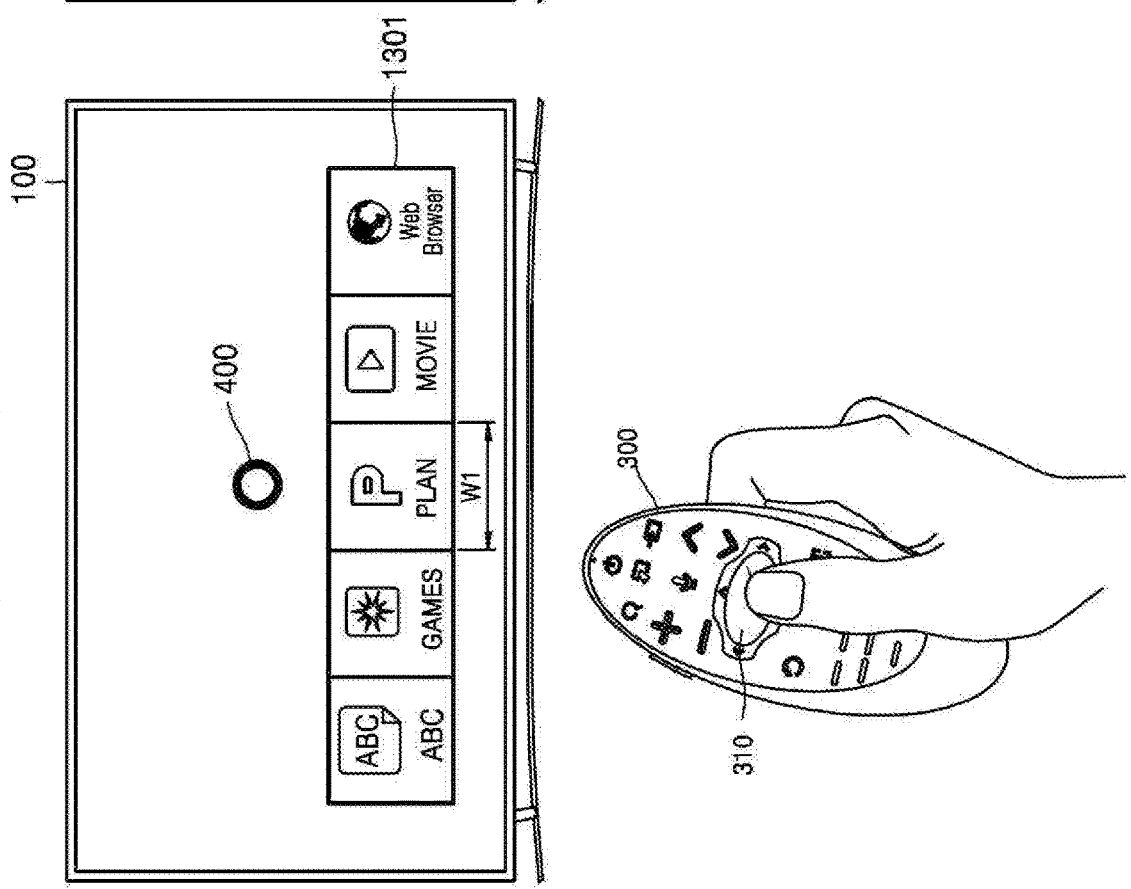

FIGS. 13A and 13B are diagrams illustrating an example image output apparatus 100 changing an attribute of a function list 1301, according to an example embodiment.

A control device 300 may be realized as any one of various devices for controlling the image output apparatus 100, such as, for example, and without limitation, a remote controller or a mobile phone.

Hereinafter, an item may denote a detail function included in a function list. The item may correspond to the detail function of an external apparatus.

Also, the control device 300 may control the image output apparatus 100 via a local area network using infrared ray or Bluetooth. The control device 300 may control functions of the image output apparatus 100 by using at least one of a key (including a button), a touch pad, a microphone (not shown) capable of receiving voice of the user, and a sensor (not shown) capable of recognizing motion of the control device 300.

The control device 300 may include a power on/off button for turning the image output apparatus 100 on or off. The control device 300 may also change a channel, adjust volume, select a terrestrial broadcast/cable broadcast/satellite broadcast, or set a configuration of the image output apparatus 100 according to a user input.

Also, the control device 300 may be a pointing device. For example, the control device 300 may operate as a pointing device when a certain key input is received.

The image output apparatus 100 may be controlled by an input of moving the control device 300 to up, down, left, or right, or tilting the control device 300 in a certain direction. Information about movement of the control device 300, which is detected through a sensor of the control device 300, may be transmitted to the image output apparatus 100. The image output apparatus 100 may determine coordinates of the cursor on the display from the information about movement of the control device 300, and move the cursor according to the determined coordinates. Accordingly, the cursor on the display of the image output apparatus 100 may be moved or various menus displayed on the display of the image output apparatus 100 may be activated.

Alternatively, when the control device 300 includes a touch pad, the cursor may be moved or various menus may be selectively activated on the display of the image output apparatus 100 according to a displacement value of a subject, such as a finger of the user, moving on the touch pad.

Referring to FIGS. 13A and 13B, the image output apparatus 100 may display the function list 1301 including a plurality of detail functions. For example, the image output apparatus 100 may display a plurality of items indicating content. The items indicating content may include an item indicating image content, such as a movie or a series, an item indicating audio content such as music, an item indicating an application, an item indicating a broadcasting channel, and an item indicating history information of content executed by the user.

The plurality of detail functions may be respectively displayed as the plurality of items. The plurality of items may be displayed in images. For example, when the item indicates image content, such as a movie or a series, the item may be displayed in a movie or series poster image. Also, when the item indicates audio content such as music, the item may be displayed in a poster image of a music album. Also, when the item indicates an application, the item may be displayed in an image indicating the application or an application screen that was last executed. Also, when the item indicates a broadcasting channel, the item may be displayed in a screen image that was last viewed by the user or an image of a program being currently broadcasted. Also, when the item indicates history information of content executed by the user, the item may be displayed in a screen image that was last executed in the content.

Also, the image output apparatus 100 may display an item indicating an interface for connecting the image output apparatus 100 and an external apparatus or a plurality of items indicating a plurality of external apparatuses connected to the image output apparatus 100. For example, the item indicating an interface for connecting an external apparatus may be an item indicating a port of the image output apparatus 100 to which the external apparatus is connected. For example, the item indicating an interface may include an item indicating a HDMI port, an item indicating a component jack, an item indicating a PC port, or an item indicating a USB port. Also, the item indicating an external apparatus may be an item indicating an external apparatus connected to the interface.

Referring to FIGS. 13A and 13B, the image output apparatus 100 may display the function list 1301 including items having quadrangular shapes at the bottom of the image output apparatus 100, wherein the quadrangular shapes may be rectangles in which widths are smaller than heights. Also, the items may have the same width or may have different widths based on types and characteristics of content corresponding to the items. However, shapes of the items are not limited thereto.

Also, as illustrated in FIGS. 13A and 13B, the function list 1301 may include the plurality of items arranged in a horizontal direction. When the number of items included in the function list 1301 is equal to or higher than a pre-set number, only some of the items may be displayed on the image output apparatus 100 and the function list 1301 may be scrolled left and right. When the function list 1301 is scrolled left and right, items that were not displayed may be displayed. Meanwhile, the function list 1301 may include the items that are arranged in a vertical direction.

Referring to FIG. 13A, the control device 300 may transmit a certain key to the image output apparatus 100 when an input of touching a touch region 310 of the control device 300 is received or when a certain button of a user input unit of the control device 300 is pressed. When the certain key is received from the control device 300, the image output apparatus 100 may operate in a pointing mode. When the image output apparatus 100 operates in the pointing mode, the image output apparatus 100 may display the cursor 400 on the display of the image output apparatus 100, and move the cursor 400 upon receiving a pointing signal from the control device 300.

For example, the image output apparatus 100 may receive information about movement of the control device 300, which is detected through a sensor of the control device 300, to determine coordinates of the cursor 400 on the display, and move the cursor 400 according to the determined coordinates.

Alternatively, when the control device 300 includes a touch pad, the image output apparatus 100 may move the cursor 400 on the display based on a displacement value of a subject, such as a finger of the user, moving on the touch pad.

In FIG. 13A, the cursor 400 is illustrated as a circle, but the cursor 400 is not limited thereto and may have any one of various shapes and sizes. Also, a shape and size of the cursor 400 may be variously set based on an input. Also, the cursor 400 may be located within any one of a plurality of items included in the function list 1301. When the cursor 400 is located within any one of the items, the corresponding item may be highlighted.

However, as illustrated in FIG. 13B, when the touch region 310 of the control device 300 is not touched or a certain button is not pressed, the image output apparatus 100 may operate in a four-way mode. When the image output apparatus 100 operates in the four-way mode, one of items included in the function list 1301 may be highlighted. For example, when an item is highlighted, a quadrangular box may be displayed around the item or a width of the item may be changed from a first width W1 to a second width W2. Alternatively, opacity of an image displayed in the item may be changed.

Also, when the image output apparatus 100 operates in the four-way mode, the image output apparatus 100 may change an item being highlighted in the function list 1301 upon receiving an input of pressing a four-way key or button of the control device 300. For example, when a right direction button is pressed from the four-way button, an adjacent item at the right of the item being highlighted may be highlighted. For example, a quadrangular box may be displayed around the adjacent item or a width of the adjacent item may be changed.

Meanwhile, when the image output apparatus 100 receives an infrared (IR) signal from the control device 300 while operating in the pointing mode, the image output apparatus 100 may switch to the four-way mode. For example, when an input of pressing the four-way key or button is received while operating in the pointing mode, the image output apparatus 100 may switch to the four-way mode. The image output apparatus 100 may not display the cursor 400 on the image output apparatus 100, and one of the items included in the function list 1301 may be highlighted.

Also, when the image output apparatus 100 receives a pointing signal instead of an IR signal from the control device 300 while operating in the four-way mode, the image output apparatus 100 may be switched to the pointing mode.

Meanwhile, when a user input of selecting the highlighted item is detected, the image output apparatus 100 may perform an operation corresponding to the highlighted item. For example, when the highlighted item is an item indicating an application, and the user input of selecting the highlighted item is detected, the image output apparatus 100 may execute the application. Also, the image output apparatus 100 may display an execution screen of the application. Here, when a certain key input of the control device 300 is detected, the image output apparatus 100 may end the executing of the application. For example, when an input of pressing one of the four-way key of the control device 300 long is detected, the image output apparatus 100 may end displaying the execution screen of the application and display the function list 1301 again.

Also, the image output apparatus 100 according to an example embodiment may move the cursor 400 according to an input of the control device 300, and continuously change an attribute of at least one item according to a location relationship between the cursor and the at least one item.

Figure 14:
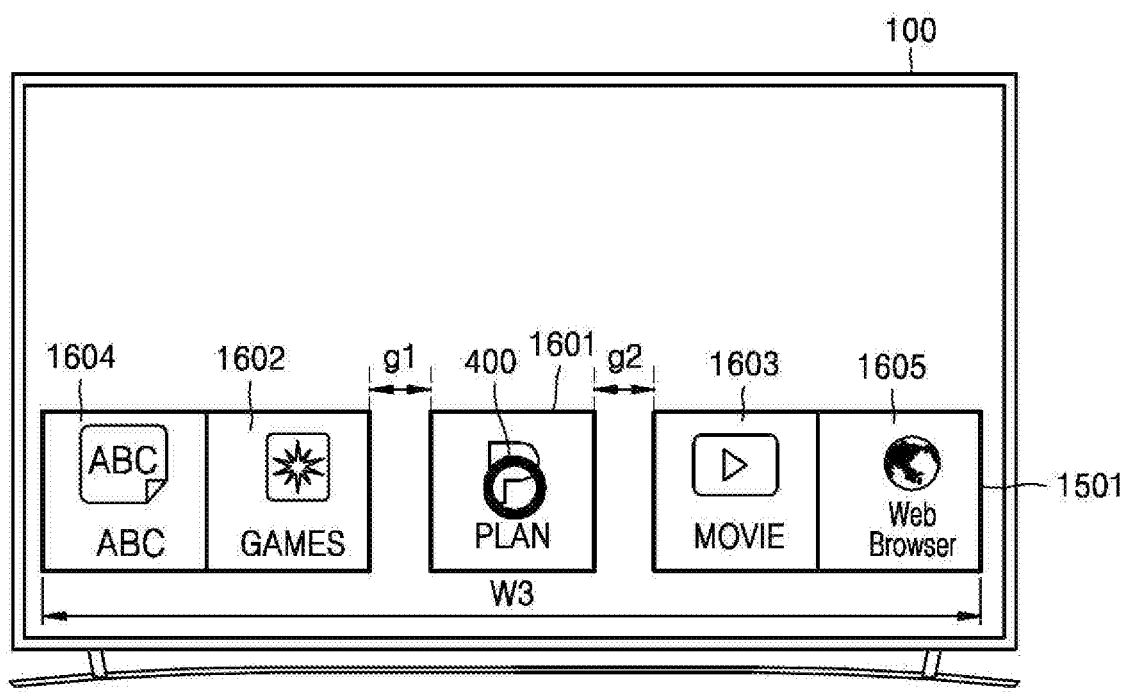
FIGS. 14 through 16 are diagrams illustrating an example of an interval between a highlighted item and an adjacent item of the highlighted item changing according to movement of a cursor, according to an example embodiment.
Figure 14:
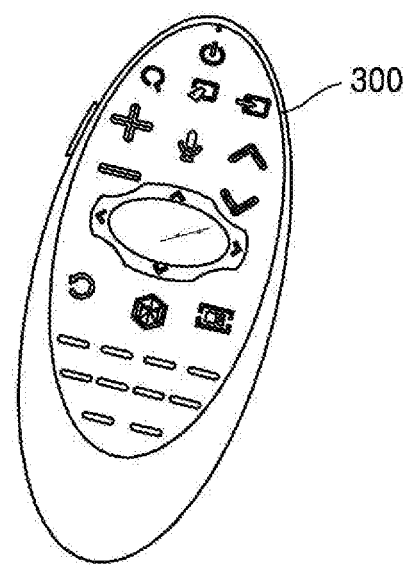
Figure 15:
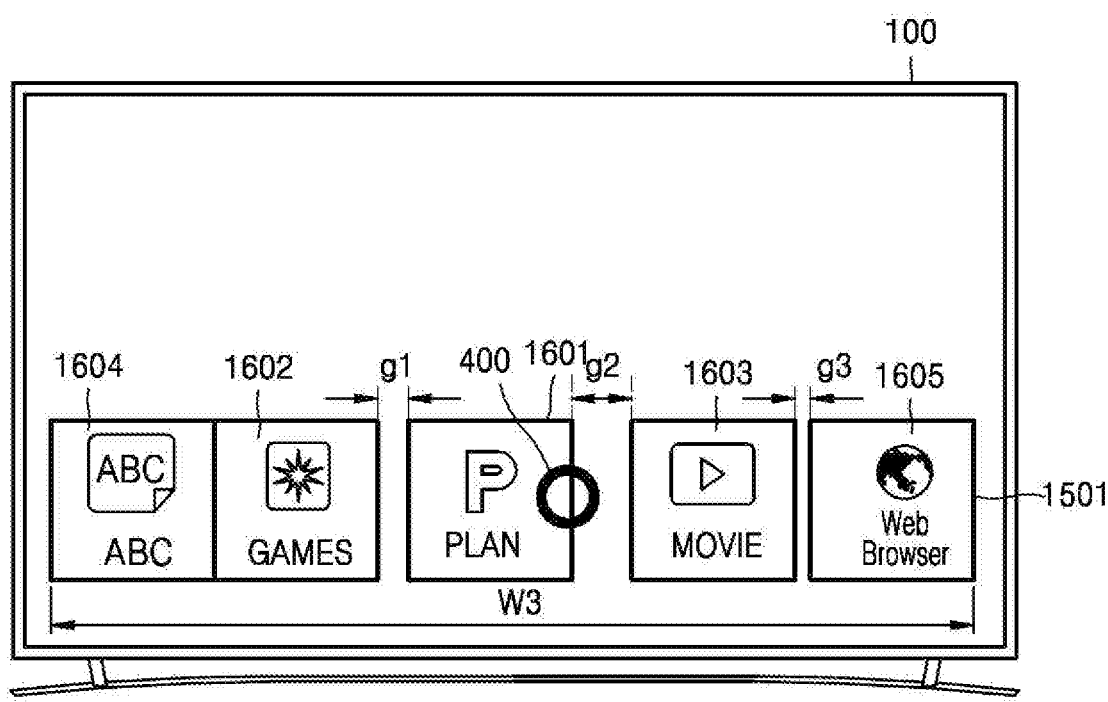
Figure 15:
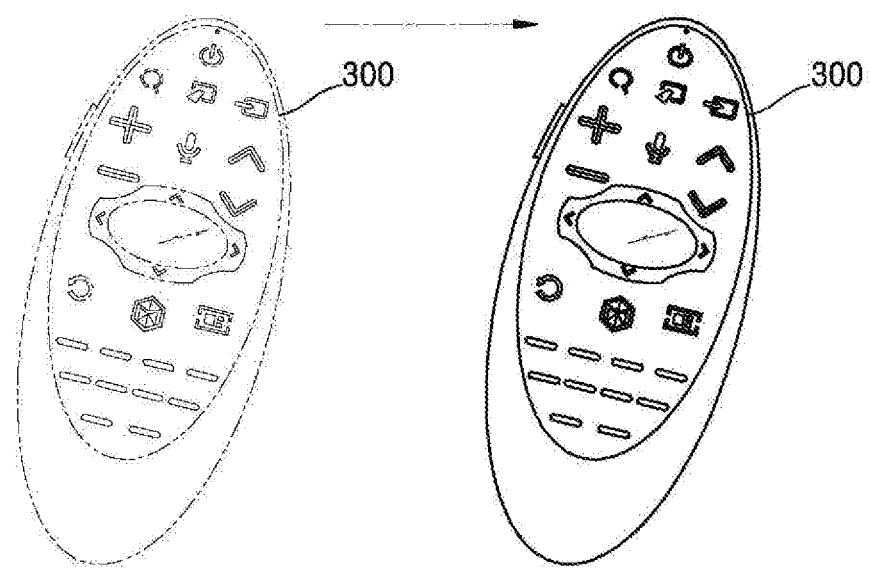
Figure 16:
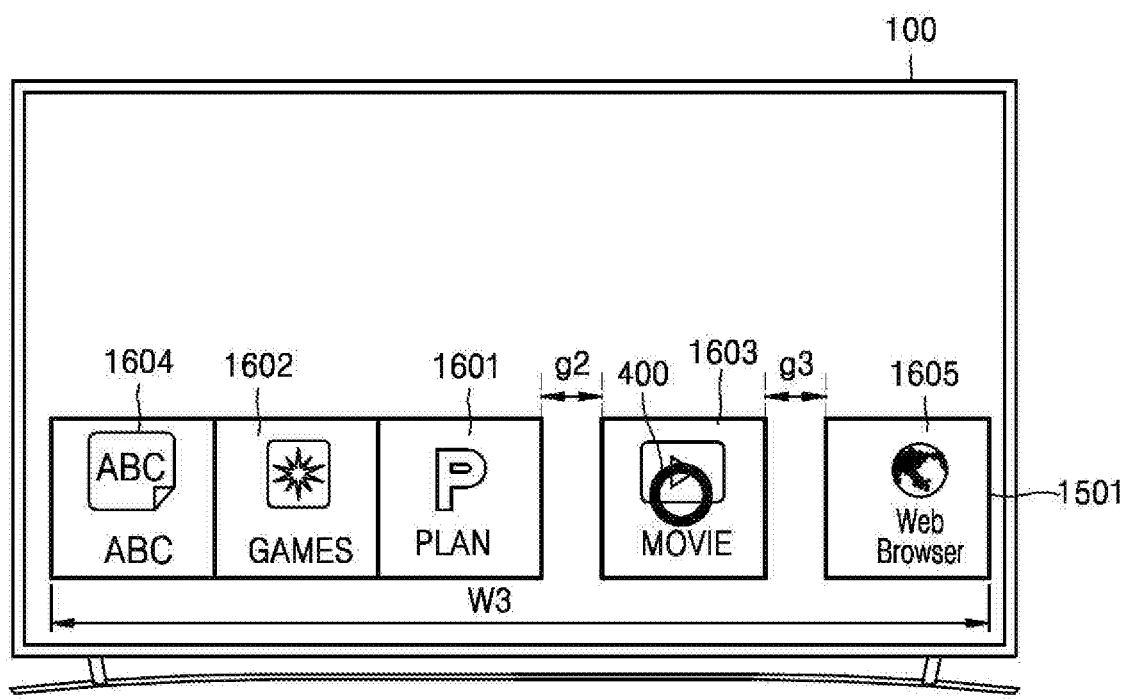
Figure 16:
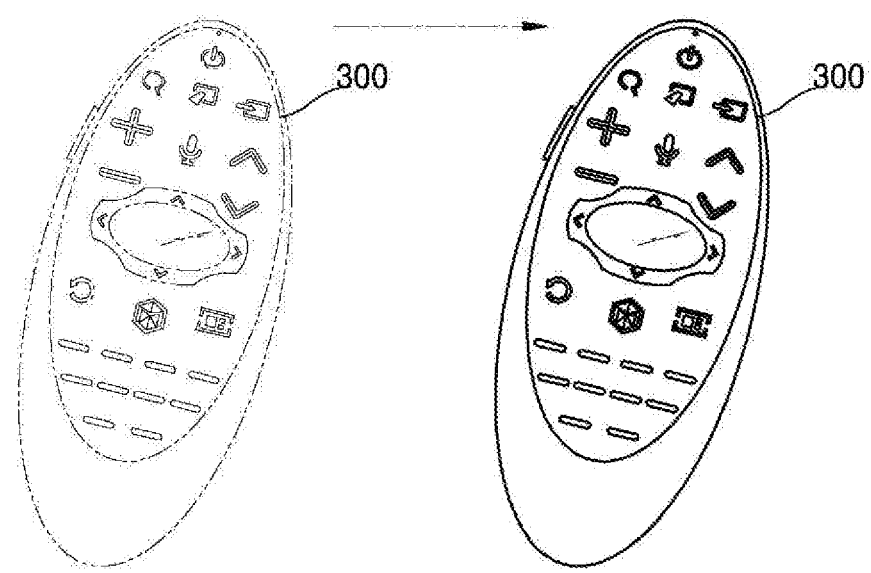

FIGS. 14 through 16 are diagrams illustrating an example of an interval between a highlighted item and an adjacent item of the highlighted item changing according to movement of a cursor, according to an example embodiment.

An example embodiment of changing an interval between items, which is described with reference to FIGS. 14 through 16, is only an example of changing an attribute of a function list by the image output apparatus 100.

Referring to FIG. 14, the image output apparatus 100 may display a function list 1501 including items having quadrangular shapes at a bottom of a display. The function list 1501 may include a plurality of items arranged in a horizontal direction, and the plurality of items may have the same width. Hereinafter, for convenience of description, the function list 1501 includes five items.

Also, the image output apparatus 100 may operate in a pointing mode described above with reference to FIG. 13A. Accordingly, the image output apparatus 100 may display the cursor 400 indicating a location of a user input, and move the cursor 400 on the display according to a detected user input.

When the cursor 400 according to an embodiment is located at substantially a center line of a first item 1601 from among the items included in the function list 1501, the image output apparatus 100 may change a first gap g1 between the first item 1601 and a second item 1602 adjacent to the first item 1601, and a second gap g2 between the first item 1601 and a third item 1603 adjacent to the first item 1601 to have a largest gap available for adjacent items.

Also, the image output apparatus 100 may change gaps of remaining adjacent items to have a smallest gap available for adjacent items. For example, a gap between a fourth item 1604 (an item that is not adjacent to a highlighted item) and the second item 1602 may be 0. Also, a gap between a fifth item 1605 and the third item 1603 may also be 0.

Meanwhile, the image output apparatus 100 may detect a user input of moving the control device 300 to up, down, left, or right, or tiling the control device 300. For example, the image output apparatus 100 may detect a moving direction and a moving degree of the control device 300 and move the cursor 400 on the display according to the detected moving direction and moving degree. Also, the image output apparatus 100 may move the cursor 400 on the display according to a direction of a touch input detected on a touch panel of the control device 300.

As illustrated in FIG. 15, when a user input of moving the control device 300 to right is detected, the image output apparatus 100 may move the cursor 400 to right on the display accordingly. Here, information about movement of the control device 300, which is detected through a sensor of the control device 300, may be transmitted to the image output apparatus 100. The image output apparatus 100 determines coordinates of the cursor 400 from the information about the movement, and move the cursor 400 on the display according to the determined coordinates.

As illustrated in FIG. 15, when the cursor 400 moves to right (when the cursor 400 moves away from the center line of the first item 1601 and approaches the third item 1603 at the right of the first item 1601), the image output apparatus 100 may gradually reduce the first gap g1 between the first and second items 1601 and 1602 and gradually increase a third gap g3 between the third and fifth items 1603 and 1605.

According to an example embodiment, a degree of reducing the first gap g1 and a degree of increasing the third gap g3 may be the same. Also, the second gap g2 between the first and third items 1601 and 1603 may be uniformly maintained. Accordingly, a width W3 of the function list 1501 may be uniformly maintained when the cursor 400 is located at the center line of the first item 1601 as in FIG. 14 and when the cursor 400 moves towards the third item 1603 as in FIG. 15.

Also, when the cursor 400 is located at a center line of the third item 1603 as illustrated in FIG. 16 while continuously moving to right, the image output apparatus 100 may change the third gap g3 between the third and fifth items 1603 and 1605 to have the largest gap. Also, the third gap g3 between the third and fifth items 1603 and 1605 and the second gap g2 between the first and third gaps 1601 and 1603 may be the same.

Also, the image output apparatus 100 may change the first gap g1 between the first and second items 1601 and 1602 to be the smallest gap (for example, 0). Accordingly, the width W3 of the function list 1501 may be uniformly maintained when the cursor 400 is located at the center line of the first line 1601 as in FIG. 14 and when the cursor 400 is located at the center line of the third item 1603 as in FIG. 16.

Figure 17:
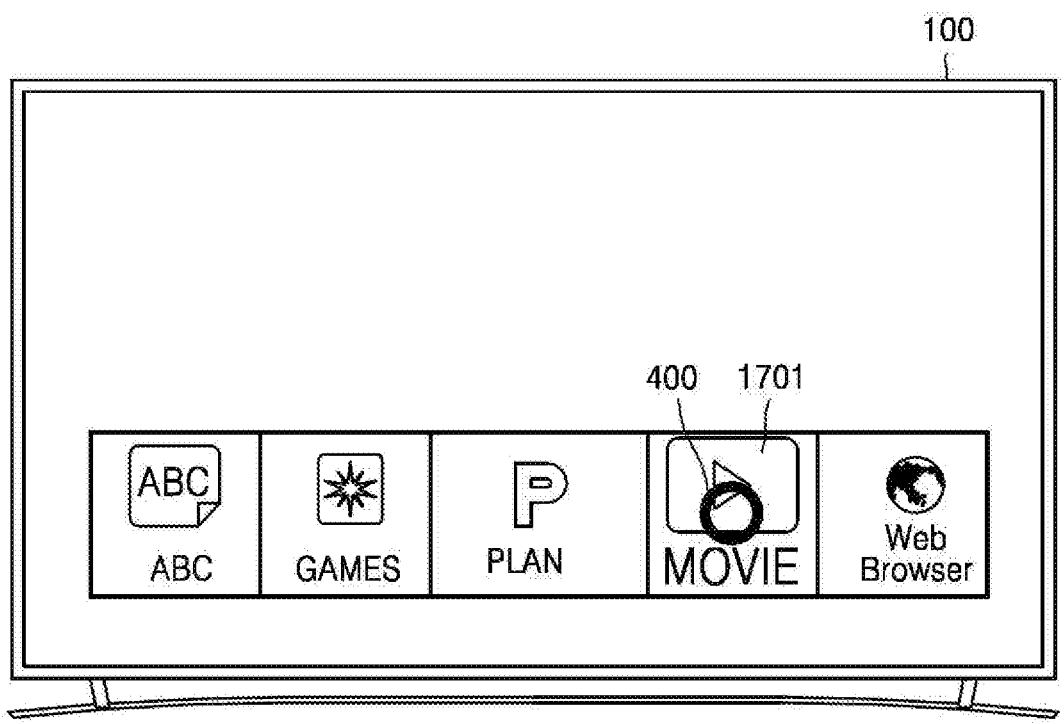
FIG. 17 is a diagram illustrating an example image output apparatus changing an attribute of a function list, according to an example embodiment.

FIG. 17 is a diagram illustrating an example image output apparatus 100 changing an attribute of a function list, according to an example embodiment.

The image output apparatus 100 may detect the cursor 400 on an item 1701 of a function list. When the cursor 400 is located on the item 1701, the image output apparatus 100 may enlarge an image displayed on the item 1701. Also, when the cursor 400 moves away from the center of the item 1701, the image output apparatus 100 may continuously reduce images displayed on items.

A user may check that an attribute of an item changes according to a location of a cursor to easily identify a detail function of a function list.

Figure 18:
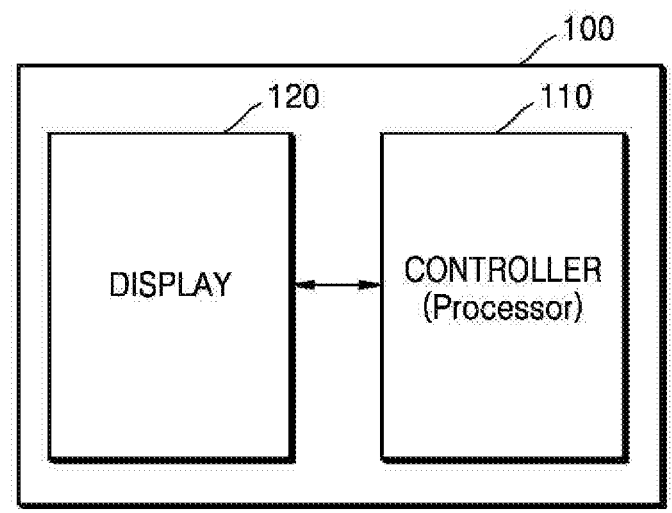
FIGS. 18 and 19 are block diagrams illustrating an example image output apparatus, according to various example embodiments.
Figure 19:
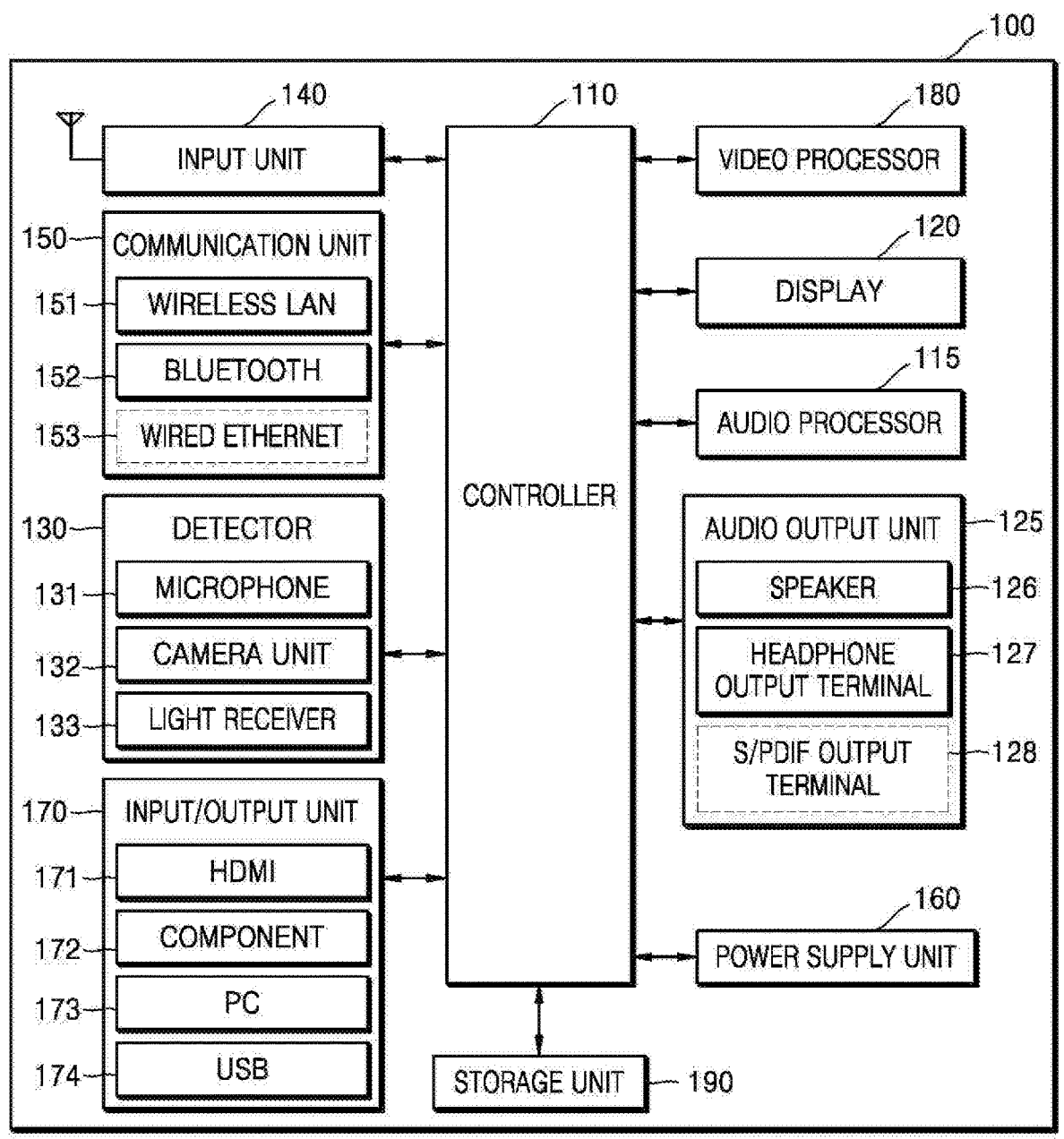

FIGS. 18 and 19 are block diagrams illustrating an example image output apparatus 100, according to various example embodiments.

As illustrated in FIG. 18, the image output apparatus 100 according to some example embodiments may include the display 120 and a controller (e.g., including processing circuitry) 110. However, components illustrated in FIG. 18 are not all essential components of the image output apparatus 100. The image output apparatus 100 may be realized by more or less components than those illustrated in FIG. 18.

For example, as illustrated in FIG. 19, the image output apparatus 100 according to some example embodiments may further include, in addition to the controller 110 and the display 120, a detector (e.g., including detecting circuitry) 130, an input unit (e.g., including input circuitry) 140, a communication unit (e.g., including communication circuitry) 150, a power supply unit 160, an input/output unit (e.g., including input/output circuitry) 170, a video processor 180, an audio processor 115, an audio output unit (e.g., including audio output circuitry) 125, and a storage unit 190.

The display 120 may generate a driving signal by converting an image signal, a data signal, an on-screen-display (OSD) signal, or a control signal, which is processed by the controller 110. Meanwhile, when the display 120 and a touch pad form a layer structure to configure a touch screen, the display 120 may be used as an input device as well as an output device. The display 120 may include at least one of a liquid crystal display, a thin-film transistor-liquid crystal display, an organic light-emitting diode, a flexible display, a 3-dimensional (3D) display, and an electrophoretic display.

Also, according to an example embodiment of the image output apparatus 100, the image output apparatus 100 may include at least two displays 120. Here, the at least two displays 120 may be disposed to face each other by using a hinge. Alternatively, the two displays 120 may be disposed respectively on two surfaces of the image output apparatus 100. However, an embodiment is not limited thereto.

The display 120 may display a function list based on determination of the controller 110. Also, the display 120 may display the function list in a notification window for notifying a user that an external apparatus is connected to the image output apparatus 100.

Also, the display 120 may display a selection menu in the notification window for notifying the user that the external apparatus is connected.

Also, the display 120 may display, together with the function list, information indicating a type of a communication interface through which the external apparatus is connected.

Also, the display 120 may display a cursor on the display 120. The cursor may indicate a location of a user input on the display 120.

For example, according to an example embodiment, the controller 110 may include various processing circuitry configured to determine whether to display the function list indicating at least one detail function of a service corresponding to the external apparatus, based on an input of a user selecting the selection menu. Also, the controller 110 may control the image output apparatus 100 according to a user command detected through the user input unit 140 or according to an internal program.

The controller 110 may generally control overall operations of the image output apparatus 100. For example, the controller 110 may execute programs stored in the storage unit 190 to generally control the user input unit 140, the communication unit 150, the power supply unit 160, the input/output unit 170, the video processor 180, the audio processor 115, and the audio output unit 125.

The controller 110 may control executing of a detail function of the external apparatus, which corresponds to the selected function list. Also, the controller 110 may control ending of the execution of the detail function, and displaying of a shortcut icon for re-executing the detail function.

Also, when the shortcut icon is selected, the controller 110 may control the detail function that was being executed before the ending of the detail function to be re-executed. Also, the controller 110 may control the function list to be displayed when an edge portion of a screen of the display 120 is selected. Also, the controller 110 may control the function list to be displayed at a pre-set region of the selected edge portion.

Also, the controller 110 may control displaying of a list of the external apparatus and other external apparatuses connected to the image output apparatus 100.

Also, the controller 110 may control moving of the cursor according to a user input for moving the cursor, and changing of an attribute of the function list based on a location relationship between the function list and the cursor.

Also, the controller 110 may control at least one of changing of a size of the function list, enlarging of content displayed in the function list, reducing of the content displayed in the function list, and changing of opacity of the content displayed in the function list.

Also, the controller 110 may control the function list to be displayed when a location of the cursor is at a pre-set region on the display 120.

The audio processor 115 processes audio data. The audio processor 115 may perform various processes, such as decoding, amplifying, and noise-filtering, on the audio data. Meanwhile, the audio processor 115 may include a plurality of audio process modules in order to process audio corresponding to a plurality of pieces of content.

The audio output unit 125 may output audio according to control of the controller 110. The audio output unit 125 may output audio (for example, voice or sound) input through the communication unit 150 or the input/output unit 170. Also, the audio output unit 125 may output audio stored in the storage unit 190 according to control of the controller 110. The audio output unit 125 may include at least one of a speaker 126, a headphone output terminal 127, and a Sony/Phillips Digital Interface S/PDIF) output terminal 128. The audio output unit 125 may include a combination of the speaker 126, the headphone output terminal 127, and the S/PDIF output terminal 128.

The communication unit 150 may include various communication circuitry configured to connect the image output apparatus 100 to the external apparatus (for example, an audio apparatus), according to control of the controller 110. The controller 110 may control, through the communication unit 150, the external apparatus to transmit and receive content to and from the external apparatus, download an application an application from the external apparatus, or browse a web through the external apparatus. The communication unit 150 may include various communication circuitry, such as, for example, and without limitation, one or more of a wireless local area network (LAN) 151, Bluetooth 152, and a wired Ethernet 153 according to performance and a structure of the image output apparatus 100. Also, the communication unit 150 may include a combination of the wireless LAN 151, the Bluetooth 152, and the wired Ethernet 153. The communication unit 150 may receive a control signal of the control device 300 according to control of the controller 110. The control signal may be a Bluetooth type, a radio frequency (RF) signal type, or a WiFi type.

For example, the communication unit 150 may receive a signal corresponding to a Bluetooth type user input (for example, touch, press, touch gesture, voice, or motion) from the control device 300, through the Bluetooth 152. The communication unit 150 may further include a local area network (for example, near field communication (not shown) or Bluetooth low energy (BLE, not shown) in addition to the Bluetooth 152.

The detector 130 may include various detecting circuitry configured to detect voice, an image, or an interaction of the user.

A microphone 131 may receive uttered voice of the user. The microphone 131 may convert and output, to the controller 110, the received uttered voice to an electric signal. User's voice may include, for example, voice corresponding to a menu or function of the image output apparatus 100. A recognition range of the microphone 131 is recommended to be within 4 m from the microphone 131 to a user's location, and may vary according to loudness of the user's voice and a surrounding environment (for example, a speaker sound and ambient noise).

A camera unit 132 may include a lens (not shown) and an image sensor (not shown). The camera unit 132 may support an optical zoom or a digital zoom by using a plurality of lenses and image processing. A recognition range of the camera 132 may be variously set according to a camera angle and a surrounding environment condition. When the camera unit 132 includes a plurality of cameras, a 3D still image or 3D motion may be obtained by using the plurality of cameras.

The camera unit 132 may be integrated to or separated from the image output apparatus 100. A separate apparatus (not shown) including the separated camera unit 132 may be electrically connected to the image output apparatus 100 through the communication unit 150 or the input/output unit 170.

It would be apparent to one of ordinary skill in the art that the camera unit 132 may not be included according to performance and a structure of the image output apparatus 100.

A light receiver 133 receives an optical signal (including a control signal) received from the control device 300 through an optical window (not shown) of a bezel of the display 120. The light receiver 133 may receive an optical signal corresponding to a user input (for example, touch, press, touch gesture, voice, or motion) from the control device 300. A control signal may be extracted from the received optical signal according to control of the controller 110.

The input/output unit 170 may include various input/output circuitry configured to receive a video (for example, a moving image), audio (for example, voice or music), and additional information (for example, an electronic program guide (EPG)) from an external source of the image output apparatus 100, according to control of the controller 110.

The input/output unit 170 may include various input/output circuitry, such as, for example, and without limitation, one or more of a HDMI port 171, a component jack 172, a PC port 173, and a USB port 174. The input/output unit 170 may include a combination of the HDMI port 171, the component jack 172, the PC port 173, and the USB port 174.

It would be apparent to one of ordinary skill in the art that a structure and operations of the input/output unit 170 would vary according to embodiments.

The input unit 140 may include various input circuitry for the user to input a signal for controlling the image output apparatus 100. Examples of the input unit 140 include various input circuitry, such as, for example, and without limitation, a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The input unit 140 may receive a user input of selecting a selection menu or a function list displayed on the image output apparatus 100. Also, the user input unit 140 may receive a user input for selecting an item in the function list provided by an external apparatus.

The power supply unit 160 may supply power from an external power supply source to components included in the image output apparatus 100 according to control of the controller 110. Also, the power supply unit 160 may supply power output from one or more batteries (not shown) disposed in the image output apparatus 100 to the components included in the image output apparatus 100 according to control of the controller 110.

The video processor 180 may process video data received by the image output apparatus 100. The video processor 180 may perform various image processes, such as decoding, scaling, noise filtering, frame rate converting, and resolution converting, on video data.

The storage unit 190 may store various types of data, programs, or applications to drive and control the image output apparatus 100 according to control of the controller 110. The storage unit 190 may store an input/output signal or data corresponding to driving of the detector 130, user input unit 140, communication unit 150, power supply unit 160, input/output unit 170, video processor 180, audio processor 115, and audio output unit 125, in addition to the display 120. The storage unit 190 may store a control program for controlling of the image output apparatus 100 and the controller 110, an application initially provided by a manufacturer or downloaded from an external source, a GUI related to an application, an object (for example, an image, text, an icon, or a button) for providing a GUI, user information, a document, a database, or related data.

According to an example embodiment, the term "storage unit" may include the storage unit 190 and a memory card (for example, a micro secure digital (SD) card or a USB memory) that is mounted on the controller 110 or the image output apparatus 100. Also, the storage unit 190 may include a non-volatile memory, a volatile memory, a hard disk drive (HDD), or a solid state drive (SSD).

The storage unit 190 may include a broadcasting receiving module, a channel control module, a volume control module, a communication control module, a voice recognizing module, a motion recognizing module, a light receiving module, a display control module, an audio control module, an external input control module, a power control module, a power control module of an external apparatus connected wirelessly (for example, Bluetooth), a voice database, and a motion database, which are not shown. The modules and databases of storage unit 190 may be embodied in software so as to perform a broadcasting reception control function, a channel control function, a volume control function, a communication control function, a voice recognizing function, a motion recognizing function, a light reception control function, a display control function, an audio control function, an external input control function, a power control function, and a power control function of the external apparatus connected wirelessly (for example, Bluetooth) in the image output apparatus.

The controller 110 may use the software stored in the storage unit 190 to perform each of the functions.

The storage unit 190 may store software including a base module, a sensing module, a communication module, a presentation module, a web browser module, and a service module.

The base module may be a module that processes a signal received from each piece of hardware included in the image output apparatus 100 and transmits the signal to an upper layer module. The base module may include a storage module, a security module, and a network module.

The storage module is a program module that manages a database or a registry. The controller 110 may use the storage module to access a database in the storage unit 190 and read various types of data.

The security module is a program module supporting certification, permission, and secure storage with respect to hardware.

Also, the network module is a module for supporting a network connection, and may include a DNET module and a UPnP module.

The sensing module is a module for collecting information from various sensors, and analyzing and managing the collected information. The sensing module may include a head direction recognizing module, a face recognizing module, a voice recognizing module, a motion recognizing module, and an NFC recognizing module.

The communication module is a module for performing communication with an external device. The communication module may include a messaging module storing a short message service (SMS) & multimedia message service (MMS) program or an email program, and a telephony module including a call information aggregator program module or a VoIP module.

The presentation module is a module for configuring a screen of the display 120. The presentation module may include a multimedia module for reproducing and outputting multimedia content, and a UI rendering module for performing UI and graphic processes.

The multimedia module may include a player module, a camcorder module, and a sound processing module. Accordingly, the multimedia module performs operations of generating and reproducing a screen and sound by reproducing various types of multimedia content. The UI rendering module include an image compositor module that combines images, a coordinate combining module that combines and generates coordinates on a screen for displaying an image, an X11 module for receiving various events from hardware, and 2D/3D UI toolkit providing a tool for configuring a 2D or 3D UI.

The web browser module is a module for performing web browsing to access a web server. The web browser module may include various modules, such as a web view module for configuring a web page, a download agent module for performing downloading, a bookmark module, and a webkit module.

The service module is a module including various applications for providing various services. For example, the service module may include various program modules including a social network service (SNS) program, a content reproducing program, a game program, an electronic book program, a calendar program, an alarm management program, and other widgets.

Also, the image output apparatus 100 including the display 120 may be electrically connected to a separate external apparatus (for example, a set-top box) including a tuner unit. For example, the image output apparatus 100 may be embodied as an analog TV, a digital TV, a 3D TV, a smart TV, an LED TV, an OLED TV, a plasma TV, or a monitor, or the like, but is not limited thereto.

The image output apparatus 100 may include a sensor (for example, an illumination sensor or a temperature sensor) for detecting internal and external states of the image output apparatus 100.

Meanwhile, the block diagrams of the image output apparatus 100 illustrated in FIGS. 18 and 19 are only examples. Some of the components of each block diagram may be integrated or omitted, or a component may be added according to specification of the image output apparatus 100. In other words, two or more components may be integrated as one component if required, or one component may be divided into at least two components. Also, functions performed by each component are only an example, and detailed operations do not limit the scope of the disclosure.

The example embodiments of the present disclosure can be written as computer programs and can be implemented in general-use digital computers that execute the programs using a non-transitory computer-readable recording medium. Also, a structure of data used in the embodiments may be recorded on a non-transitory computer-readable recording medium via various means. Also, the example embodiments may also be realized in a form of a non-transitory computer-readable recording medium, such as a program module executed by a computer. For example, methods realized in a software module or an algorithm may be stored as program instructions or computer-readable codes executable, on a computer-readable media.

A non-transitory computer-readable recording medium may be an arbitrary available medium accessible by a computer, and examples thereof include all volatile and non-volatile media and separable and non-separable media. Examples of the non-transitory computer-readable recording medium include magnetic storage media (e.g., ROM, floppy disks, hard disks, etc.), optical recording media (e.g., CD- ROMs, or DVDs), etc. Further, examples of the non-transitory computer-readable recording medium may include a computer storage medium and a communication medium.

The non-transitory computer-readable recording medium can also be distributed over network coupled computer systems so that the computer-readable code is stored and executed in a distributed fashion. This media can be read by the computer, stored in the memory, and executed by the processor.

The particular implementations illustrated and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail.

While the present disclosure has been particularly illustrated and described with reference to example embodiments thereof, it will be understood by those of ordinary skill in the art that various changes in form and details may be made therein without departing from the spirit and scope of the present disclosure as defined by the following claims. Hence, it will be understood that the example embodiments described above do not limit the scope of the present disclosure. For example, each software component described as being executed on a single hardware component may be executed in a distributed manner, and components described as being executed in a distributed manner may also be executed in an integrated form.

In the disclosure, terms such as "unit" and "module" indicate a unit for processing at least one function or operation, wherein the unit and the block may be embodied as hardware or software or embodied by combining hardware and software.

The "unit" or "module" may be formed so as to be in an addressable storage medium, or may be formed so as to operate one or more processors.

According to an example embodiment, a list of external apparatuses connected to an image output apparatus may be easily checked.

According to an example embodiment, by displaying a function of an external apparatus, which has not been executed after the external apparatus is connected to an image output apparatus, a user may execute the function any time, thereby increasing user convenience.

According to an example embodiment, recognition fatigue of a user may be reduced by continuously changing attributes of items included in a function list according to a location of a cursor.

According to an example embodiment, when an item included in a function list is selected by using a cursor, accuracy of selecting the item may be increased.

It should be understood that example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of providing, by an image output apparatus, a graphical user interface (GUI) for providing a service to a user, the method comprising:
    displaying a selection menu for identifying whether to execute a pre-set function related to a service corresponding to at least one external apparatus based on the at least one external apparatus being connected to the image output apparatus;
    identifying whether to display a function list indicating at least one detail function of the service corresponding to the at least one external apparatus, based on a selection input with respect to the selection menu;
    executing the pre-set function related to the service corresponding to the at least one external apparatus, based on selection for executing the pre-set function through the selection menu; and
    displaying the function list, based on no selection for the executing of the pre-set function through the selection menu,
    wherein, the function list comprises information indicating a connection state between the image output apparatus and the at least one external apparatus, and
    based on a plurality of external apparatuses being connected to the image output apparatus, the function list indicates at least one detail function of the service corresponding to an external apparatus that is most recently connected to the image output apparatus, the displaying the function list further comprises displaying the function list with a list of the plurality of external apparatuses,
    the at least one detail function indicated by the function list is immediately executable based on a selection input through the function list.

2. The method of claim 1, wherein the displaying of the selection menu comprises displaying the selection menu in a notification window notifying that the external apparatus is connected to the image output apparatus.

3. The method of claim 1, wherein the displaying of the selection menu comprises:
    displaying a notification window notifying that the external apparatus is connected to the image output apparatus; and
    displaying the selection menu after the notification window is displayed.

4. The method of claim 1, wherein the at least one detail function comprises the pre-set function related to the service while controlling the service corresponding to the external apparatus.

5. The method of claim 1, wherein the function list indicating the at least one detail function comprises items for executing the at least one detail function.

6. The method of claim 5, further comprising:
    receiving an input for selecting the function list; and
    executing a detail function of the external apparatus corresponding to the selected function list.

7. The method of claim 6, further comprising:
    ending the execution of the detail function; and
    displaying a shortcut icon for re-executing the ended detail function.

8. The method of claim 7, further comprising re-executing the detail function that was being executed before the ending of the executed detail function, when the shortcut icon is selected.

9. The method of claim 1, wherein the displaying of the function list comprises displaying the function list together with information indicating a type of a communication interface connecting the external apparatus to the image output apparatus.

10. The method of claim 1, wherein the displaying of the function list comprises displaying the function list when an edge portion of a screen of the image output apparatus is selected.

11. The method of claim 10, wherein the displaying of the function list comprises displaying the function list at a pre-set portion of the edge portion of the screen.

12. The method of claim 1, further comprising displaying a list of the external apparatus and other external apparatuses connected to the image output apparatus.

13. The method of claim 1, further comprising:
displaying a cursor on a display of the image output apparatus;
detecting an input for moving the cursor; and
moving the cursor based on the input and changing an attribute of the function list based on a location relationship between the function list and the cursor.

14. The method of claim 13, wherein the changing of the attribute comprises:
changing a size of the function list;
enlarging an item displayed in the function list;
reducing the item displayed in the function list; and
changing an opacity of the item displayed in the function list.

15. The method of claim 13, wherein the function list is displayed when a location of the cursor is at a pre-set portion on the display.

16. An image output apparatus configured to provide a GUI for providing a service, the image output apparatus comprising:
a display to display a selection menu for identifying whether to execute a pre-set function related to a service corresponding to at least one external apparatus based on the at least one external apparatus being connected to the image output apparatus; and
a controller configured to identify whether to display a function list indicating at least one detail function of the service corresponding to the at least one external apparatus, based on a selection input with respect to the selection menu,
wherein the controller executes the pre-set function related to the service corresponding to the at least one external apparatus, based on selection for executing the pre-set function through the selection menu, and
the display displays the function list based on no selection for the executing of the pre-set function through the selection menu,
wherein, the function list comprises information indicating a connection state between the image output apparatus and the at least one external apparatus, and
based on a plurality of external apparatuses being connected to the image output apparatus, the function list indicates at least one detail function of the service corresponding to an external apparatus that is most recently connected to the image output apparatus, the display displays the function list with a list of the plurality of external apparatuses,
the at least one detail function indicated by the function list is immediately executable based on a selection input through the function list.

17. The image output apparatus of claim 16, wherein the display displays the selection menu in a notification window notifying that the external apparatus is connected to the image output apparatus.

18. The method of claim 16, wherein the display displays a notification window notifying that the external apparatus is connected to the image output apparatus, and
the controller is further configured to control the selection menu to be displayed after the notification window is displayed.

* * * * *